US012738249B2

(12) United States Patent
Jiang et al.

(10) Patent No.: US 12,738,249 B2
(45) Date of Patent: Sep. 15, 2026

(54) ARRAY SUBSTRATE, DRIVING METHOD AND DISPLAY DEVICE

(71) Applicants: WUHAN BOE OPTOELECTRONICS TECHNOLOGY CO., LTD., Wuhan (CN); BOE TECHNOLOGY GROUP CO., LTD., Beijing (CN)

(72) Inventors: Peng Jiang, Beijing (CN); Yun Li, Beijing (CN); Chao Wang, Beijing (CN); Yujie Gao, Beijing (CN); Yanping Liao, Beijing (CN); Bing Li, Beijing (CN); Ning Zhu, Beijing (CN); Yan Zhou, Beijing (CN); Xiaoxiao Chen, Beijing (CN); Yi Zhang, Beijing (CN)

(73) Assignees: WUHAN BOE OPTOELECTRONICS TECHNOLOGY CO., LTD., Wuhan (CN); BOE TECHNOLOGY GROUP CO., LTD., Beijing (CN)

( * ) Notice: Subject to any disclaimer, the term of this patent is extended or adjusted under 35 U.S.C. 154(b) by 147 days.

(21) Appl. No.: 18/726,488

(22) PCT Filed: Apr. 13, 2023

(86) PCT No.: PCT/CN2023/088001

§ 371 (c)(1),
(2) Date: Jul. 3, 2024

(87) PCT Pub. No.: WO2024/212153

PCT Pub. Date: Oct. 17, 2024

(65) Prior Publication Data

US 2026/0112330 A1 Apr. 23, 2026

(51) Int. Cl.
*G09G 3/36* (2006.01)

(52) U.S. Cl.
CPC ......... *G09G 3/3685* (2013.01); *G09G 3/3607* (2013.01); *G09G 3/3614* (2013.01);
(Continued)

(58) Field of Classification Search
CPC .. G09G 3/3685; G09G 3/3607; G09G 3/3614; G09G 2300/0426;
(Continued)

(56) References Cited

U.S. PATENT DOCUMENTS 8,970,564 B2 * 3/2015 Moon .................. G09G 3/3648 345/204
9,419,022 B1 * 8/2016 Chen ...................... H10D 86/60
(Continued)

FOREIGN PATENT DOCUMENTS

CN 101290444 A 10/2008
CN 101667397 A 3/2010
(Continued)

*Primary Examiner* — Vinh T Lam
(74) *Attorney, Agent, or Firm* — Collard & Roe, P.C.

(57) ABSTRACT

An array substrate, a driving method thereof, and a display device. In the array substrate, rows of sub-pixels include groups of sub-pixels, each group of sub-pixels includes part of the rows of sub-pixels, and charging times of the part of the rows of sub-pixels are overlapped. A charging time of the second part of the plurality of rows of sub-pixels is longer than a charging time of the first part of the plurality of rows of sub-pixels. During a first time period, a same data signal is written into the first part of the plurality of rows of sub-pixels and the second part of the plurality of rows of sub-pixels, and during a second time period, a data signal written into the second part of the plurality of rows of sub-pixels is at least partially the same as the data signal written during the first time period.

18 Claims, 10 Drawing Sheets

(52) U.S. Cl.
CPC ............... *G09G 2300/0426* (2013.01); *G09G 2300/0452* (2013.01); *G09G 2310/08* (2013.01); *G09G 2320/0209* (2013.01)

(58) Field of Classification Search
CPC ....... G09G 2300/0452; G09G 2310/08; G09G 2320/0209
See application file for complete search history.

(56) References Cited

U.S. PATENT DOCUMENTS

| | | | | |
|---|---|---|---|---|
| 10,424,602 | B2 * | 9/2019 | Wang | G09G 3/20 |
| 10,497,298 | B2 * | 12/2019 | Chen | G09G 3/3607 |
| 10,629,109 | B2 * | 4/2020 | Jiang | H10D 86/60 |
| 10,672,352 | B2 * | 6/2020 | Hao | G02F 1/134309 |
| 11,487,178 | B2 * | 11/2022 | He | G02F 1/1368 |
| 11,594,200 | B2 * | 2/2023 | Chen | G09G 3/3614 |
| 11,727,849 | B2 * | 8/2023 | Lu | G09G 3/3225 345/694 |
| 11,862,096 | B2 * | 1/2024 | Kim | G09G 3/3233 |
| 11,887,534 | B2 * | 1/2024 | Shin | G09G 3/3225 |
| 11,947,230 | B2 * | 4/2024 | Liu | G02F 1/134345 |
| 11,948,527 | B2 * | 4/2024 | Kim | G09G 3/3677 |
| 12,073,796 | B2 * | 8/2024 | Min | G09G 3/3233 |
| 12,198,650 | B2 * | 1/2025 | Lai | G09G 3/3688 |
| 12,494,181 | B2 * | 12/2025 | Park | G02F 1/13454 |
| 2012/0026151 | A1 * | 2/2012 | Kim | G09G 3/3614 345/212 |
| 2012/0206437 | A1 * | 8/2012 | Kang | G09G 3/3614 345/55 |
| 2013/0093739 | A1 * | 4/2013 | Kim | G09G 3/3648 345/206 |
| 2013/0256707 | A1 * | 10/2013 | Chiang | G02F 1/136286 257/88 |
| 2014/0054624 | A1 * | 2/2014 | Chen | H10D 86/60 257/89 |
| 2015/0379947 | A1 * | 12/2015 | Sang | G02F 1/136286 349/37 |
| 2016/0217729 | A1 * | 7/2016 | Kim | G09G 3/3233 |
| 2017/0103700 | A1 * | 4/2017 | Wang | G09G 3/30 |
| 2018/0181239 | A1 * | 6/2018 | Hao | G02F 1/13338 |
| 2018/0342217 | A1 * | 11/2018 | Kim | G09G 3/3688 |
| 2020/0234647 | A1 * | 7/2020 | Lin | G09G 3/3266 |
| 2021/0020131 | A1 * | 1/2021 | Xiong | G09G 3/3614 |
| 2021/0193035 | A1 * | 6/2021 | Li | G09G 3/3233 |
| 2022/0317495 | A1 * | 10/2022 | Feng | G06F 3/0443 |
| 2024/0005889 | A1 * | 1/2024 | Liu | G09G 3/3607 |
| 2024/0161710 | A1 * | 5/2024 | Hu | H10D 86/441 |
| 2024/0296775 | A1 * | 9/2024 | Ma | G09G 3/20 |
| 2024/0321230 | A1 * | 9/2024 | Ma | G09G 3/36 |
| 2024/0355258 | A1 * | 10/2024 | Huang | G09G 3/2074 |
| 2025/0069529 | A1 * | 2/2025 | Sun | G02F 1/1362 |

FOREIGN PATENT DOCUMENTS

| | | | |
|---|---|---|---|
| CN | 104714319 | A1 | 6/2015 |
| CN | 109509455 | A | 3/2019 |
| CN | 113223473 | A | 8/2021 |
| CN | 113608386 | A | 11/2021 |
| CN | 115719577 | A | 2/2023 |
| WO | 2022/198639 | A1 | 9/2022 |
| WO | 2022/213366 | A1 | 10/2022 |

* cited by examiner

ARRAY SUBSTRATE, DRIVING METHOD AND DISPLAY DEVICE

CROSS REFERENCE TO RELATED APPLICATIONS

This application is the National Stage of PCT/CN2023/088001 filed on Apr. 13, 2023, the disclosure of which is incorporated by reference.

TECHNICAL FIELD

Embodiments of the present disclosure relate to an array substrate, a driving method and a display device.

BACKGROUND

In the technical field of display, for example, a pixel array of a liquid crystal display panel or an Organic Light Emitting Diode (OLED) display panel generally includes a plurality of rows of gate lines and a plurality of columns of data lines arranged intersecting with the plurality of rows of gate lines. The gate lines may be driven by a gate driving circuit. The data lines may be driven by a source driving circuit. For example, the gate driving circuit provides switching-state voltage signals (gate signals) to the plurality of rows of gate lines of the pixel array, so as to control the plurality of rows of gate lines to be sequentially turned on, and at the same time, data signals are provided to the pixel units of the corresponding rows in the pixel array by the data lines, so as to form grayscale voltages that are required for the grayscales of a display image at the pixel units, thereby displaying a frame of image.

SUMMARY

At least one embodiment of the present disclosure provides an array substrate, including a pixel array formed by a plurality of rows and a plurality of columns of sub-pixels. A plurality of gate lines and a plurality of data lines intersect to define the plurality of rows and the plurality of columns of sub-pixels, each row of sub-pixels among the plurality of rows of sub-pixels is connected with two adjacent gate lines among the plurality of gate lines; at least one data line among the plurality of data lines is connected with two adjacent columns of sub-pixels among the plurality of columns of sub-pixels; the plurality of gate lines are configured to turn on the plurality of rows of sub-pixels, and the plurality of data lines are configured to charge the plurality of columns of sub-pixels that are turned on; the plurality of rows of sub-pixels include a plurality of groups of sub-pixels, each group of sub-pixels includes part of the plurality of rows of sub-pixels, each row of sub-pixels among the part of the plurality of rows of sub-pixels includes sub-pixels connected with a same gate line, and charging times of the part of the plurality of rows of sub-pixels are overlapped; the part of the plurality of rows of sub-pixels includes a first part of the plurality of rows of sub-pixels and a second part of the plurality of rows of sub-pixels, a charging time of the second part of the plurality of rows of sub-pixels is longer than a charging time of the first part of the plurality of rows of sub-pixels, during a first time period in which the charging times overlap, a same data signal is written into the first part of the plurality of rows of sub-pixels and the second part of the plurality of rows of sub-pixels, during a second time period in which the charging times do not overlap, a data signal written into the second part of the plurality of rows of sub-pixels is at least partially the same as the data signal written during the first time period.

For example, in the array substrate provided by at least one embodiment of the present disclosure, in the part of the plurality of rows of sub-pixels, a same data line is connected with a plurality of sub-pixels corresponding to a same color.

For example, in the array substrate provided by at least one embodiment of the present disclosure, the charging time of the first part of the plurality of rows of sub-pixels is a charging time of one row of sub-pixels, the charging time of the second part of the plurality of rows of sub-pixels is a charging time of two rows of sub-pixels, and the first part of the plurality of rows of sub-pixels and the second part of the plurality of rows of sub-pixels start being charged simultaneously.

For example, in the array substrate provided by at least one embodiment of the present disclosure, a same data line is connected with the plurality of groups of sub-pixels, and a plurality of sub-pixels corresponding to a same color and connected with the same data line are connected with odd rows of gate lines or even rows of gate lines.

For example, in the array substrate provided by at least one embodiment of the present disclosure, sub-pixels in a same column correspond to a same color, a plurality of sub-pixels corresponding to red are connected with the odd rows of gate lines, a plurality of sub-pixels corresponding to green are connected with the even rows of gate lines, and a plurality of sub-pixels corresponding to blue and connected with the same data line are connected with a plurality of odd rows of gate lines or a plurality of even rows of gate lines; or a plurality of sub-pixels corresponding to green are connected with the odd rows of gate lines, a plurality of sub-pixels corresponding to blue are connected with the even rows of gate lines, and a plurality of sub-pixels corresponding to red and connected with the same data line are connected with a plurality of odd rows of gate lines or a plurality of even rows of gate lines; or a plurality of sub-pixels corresponding to red are connected with the odd rows of gate lines, a plurality of sub-pixels corresponding to blue are connected with the even rows of gate lines, and a plurality of sub-pixels corresponding to green and connected with the same data line are connected with a plurality of odd rows of gate lines or a plurality of even rows of gate lines.

For example, in the array substrate provided by at least one embodiment of the present disclosure, sub-pixels in a same column correspond to a same color, a plurality of sub-pixels corresponding to red and connected with the same data line are connected with a plurality of odd rows of gate lines or a plurality of even rows of gate lines, a plurality of sub-pixels corresponding to green and connected with the same data line are connected with a plurality of odd rows of gate lines or a plurality of even rows of gate lines, and a plurality of sub-pixels corresponding to blue and connected with the same data line are connected with a plurality of odd rows of gate lines or a plurality of even rows of gate lines.

For example, in the array substrate provided by at least one embodiment of the present disclosure, an image frame includes a first display period and a second display period, two adjacent odd rows of gate lines are taken as a group, two adjacent even rows of gate lines are taken as a group, and two rows of sub-pixels connected with each group of gate lines are taken as a group of sub-pixels, for odd rows of gate lines, a plurality of groups of odd rows of gate lines are sequentially turned on during the first display period; and for even rows of gate lines, a plurality of groups of eve rows of gate lines are sequentially turned on during the second display period, and in each group of gate lines, a gate line connected with the first part of the plurality of rows of sub-pixels is turned on earlier than a gate line connected with the second part of the plurality of rows of sub-pixels.

For example, in the array substrate provided by at least one embodiment of the present disclosure, two gate lines are taken as a gate line group, two rows of sub-pixels respectively connected with the two gate lines in the gate line group form a sub-pixel group, and sub-pixels connected with the same data line in the sub-pixel group correspond to a same color, a plurality of groups of gate lines are sequentially turned on, and for each group of gate lines, a gate line connected with the first part of the plurality of rows of sub-pixels is turned on earlier than a gate line connected with the second part of the plurality of rows of sub-pixels.

For example, in the array substrate provided by at least one embodiment of the present disclosure, the plurality of gate lines include a plurality of first gate line groups, a plurality of groups of sub-pixels include a plurality of first sub-pixel groups, each first gate line group includes two adjacent gate lines, two rows of sub-pixels connected with each first gate line group form the first sub-pixel group, and two sub-pixels connected with a same data line in each first sub-pixel group correspond to a same color.

For example, in the array substrate provided by at least one embodiment of the present disclosure, the plurality of groups of sub-pixels further include a second sub-pixel group, the second sub-pixel group includes a plurality of sub-pixels connected with a gate line firstly turned on among the plurality of gate lines, and the plurality of the first sub-pixel groups include a plurality of rows of sub-pixels other than sub-pixels included in the second sub-pixel group.

At least one embodiment of the present disclosure also provides a driving method, applied to the array substrate according to any one of embodiments provided by the present disclosure, and the method includes: turning on a plurality of gate lines connected with each group of sub-pixels; and charging, during a period when the plurality of gate lines of each group of sub-pixels are turned on, each group of sub-pixels by the plurality of data lines.

For example, in the driving method provided by at least one embodiment of the present disclosure, a same data line is connected with the plurality of groups of sub-pixels, a plurality of sub-pixels having a same luminous color and connected with the same data line are connected with odd rows of gate lines or even rows of gate lines, an image frame includes a first display period and a second display period, two adjacent odd rows of gate lines are taken as a group, two adjacent even rows of gate lines are taken as a group, and two rows of sub-pixels connected with each group of gate lines are taken as a group of sub-pixels; and turning on the plurality of gate lines connected with each group of sub-pixels sequentially includes: during the first display period, turning on the odd rows of gate lines sequentially; during the second display period, turning on the even rows of gate lines sequentially, and in each group of gate lines, a gate line connected with the first part of the plurality of rows of sub-pixels is turned on earlier than a gate line connected with the second part of the plurality of rows of sub-pixels.

For example, in the driving method provided by at least one embodiment of the present disclosure, two gate lines are taken as a gate line group, two rows of sub-pixels respectively connected with the two gate lines in the gate line group form a sub-pixel group, and sub-pixels connected with the same data line in the sub-pixel group correspond to a same color. Turning on the plurality of gate lines connected with each group of sub-pixels sequentially includes: turning on a plurality of groups of gate lines sequentially, and for each group of gate lines, a gate line connected with the first part of the plurality of rows of sub-pixels is turned on earlier than a gate line connected with the second part of the plurality of rows of sub-pixels.

For example, in the driving method provided by at least one embodiment of the present disclosure, the plurality of gate lines include a plurality of first gate line groups, each group of sub-pixels includes two adjacent rows of sub-pixels, each first gate line group includes two adjacent gate lines, and two sub-pixels connected with a same data line in each first sub-pixel group correspond to a same color. Turning on the plurality of gate lines connected with each group of sub-pixels sequentially includes: turning on each gate line sequentially, and a gate line connected with the first part of the plurality of rows of sub-pixels is turned on earlier than a gate line connected with the second part of the plurality of rows of sub-pixels.

For example, in the driving method provided by at least one embodiment of the present disclosure, the charging time of the first part of the plurality of rows of sub-pixels is a charging time of one row of sub-pixels, the charging time of the second part of the plurality of rows of sub-pixels is a charging time of two rows of sub-pixels, and the first part of the plurality of rows of sub-pixels and the second part of the plurality of rows of sub-pixels start being charged simultaneously.

At least one embodiment of the present disclosure also provides a display device, including the array substrate according to any one of embodiments provided by the present disclosure.

For example, in the display device provided by at least one embodiment of the present disclosure, further including a counter substrate, and the counter substrate includes a color filter layer, the color filter layer includes a plurality of color filters, the plurality of color filters include a plurality of blue color filters, a plurality of red color filters and a plurality of green color filters, and the plurality of color filters are in one-to-one correspondence with the plurality of rows and the plurality of columns of sub-pixels.

For example, in the display device provided by at least one embodiment of the present disclosure, further including a circuit board. The circuit board is provided with a timing controller, the array substrate further includes a source driver chip, the timing controller is coupled with the source driver chip and configured to provide display data to the source driver chip; the source driver chip is coupled with the plurality of data lines and configured to provide the data signals to the plurality of data lines according to the display data.

For example, in the display device provided by at least one embodiment of the present disclosure, the circuit board further includes a level conversion unit, and the array substrate further includes a gate driving circuit, the level conversion unit is coupled with the timing controller, the gate driving circuit is connected with the level conversion unit and the plurality of gate lines, the level conversion unit is configured to receive a plurality of first clock signals provided by the timing controller, convert the plurality of first clock signals into a plurality of second clock signals, and provide the plurality of second clock signals to the gate driving circuit, and the gate driving circuit is configured to provide gate signals to the plurality of gate lines according to the plurality of second clock signals, so as to control the plurality of gate lines to be turned on.

BRIEF DESCRIPTION OF DRAWINGS

In order to clearly illustrate the technical solutions of the embodiments of the present disclosure, the drawings of the embodiments will be briefly described in the following; it is obvious that the described drawings are only related to some embodiments of the present disclosure and thus are not limitative to the present disclosure.

DETAILED DESCRIPTION

Figure 1A:
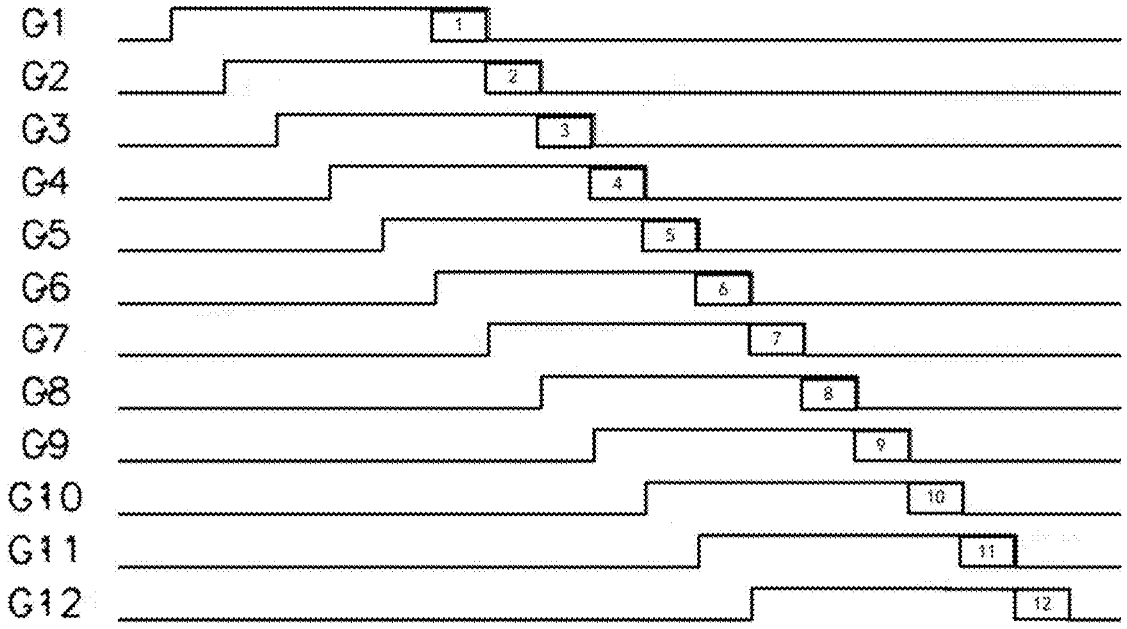
FIG. 1A shows a timing chart of a conventional pixel driving mode.

In order to make objects, technical solutions, and advantages of the embodiments of the present disclosure apparent, the technical solutions of the embodiments of the present disclosure will be described in a clearly and fully understandable way in connection with the drawings related to the embodiments of the present disclosure. Apparently, the described embodiments are just a part but not all of the embodiments of the present disclosure. Based on the described embodiments of the present disclosure, those skilled in the art can obtain other embodiment(s), without any inventive work, which should be within the scope of the present disclosure.

Unless otherwise defined, all the technical and scientific terms used herein have the same meanings as commonly understood by one of ordinary skill in the art to which the present disclosure belongs. The terms "first," "second," etc., which are used in the present disclosure, are not intended to indicate any sequence, amount or importance, but distinguish various components. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and in the case where the position of the object which is described is changed, the relative position relationship may be changed accordingly.

For example, a liquid crystal display is driven by means of row-by-row scanning, that is, various rows are turned on sequentially; every time one row is turned on, the data lines of all columns transmit data signals to the pixels in that row. According to the number of rows turned on and the input of corresponding pixel signals at a certain moment, pixel driving structures may include a single-gate pixel driving structure, a dual-gate pixel driving structure and a triple-gate pixel driving structure, etc. The single-gate pixel driving structure is that one row of sub-pixels is connected with and controlled by one gate line, and one column of sub-pixels is connected with and controlled by one data line. For example, the 1G1D structure is a conventional single-gate pixel driving structure, that is, only one row is turned on at a certain moment, and the data lines of all columns transmit data signals to the pixels in that row. In the dual-gate pixel driving structure, the number of row scan lines is doubled and at the same time, the number of data lines is reduced by half, thus reducing the number of source driver chips and further reduce the cost.

Hardware Super Resolution (HSR) technology is a scheme to achieve high refresh rate. HSR technology usually advances the charging start time of one row of sub-pixels by 1T to realize 2T charging; and the charging time of odd rows (or even rows) is ensured, and even rows (or odd rows) realize data compensation through the pre-charge function of upper and lower odd rows (even rows). Therefore, the charging time can be doubled under the condition that the resolution loss is small, which is helpful to achieve frequency doubling.

Figure 1B:
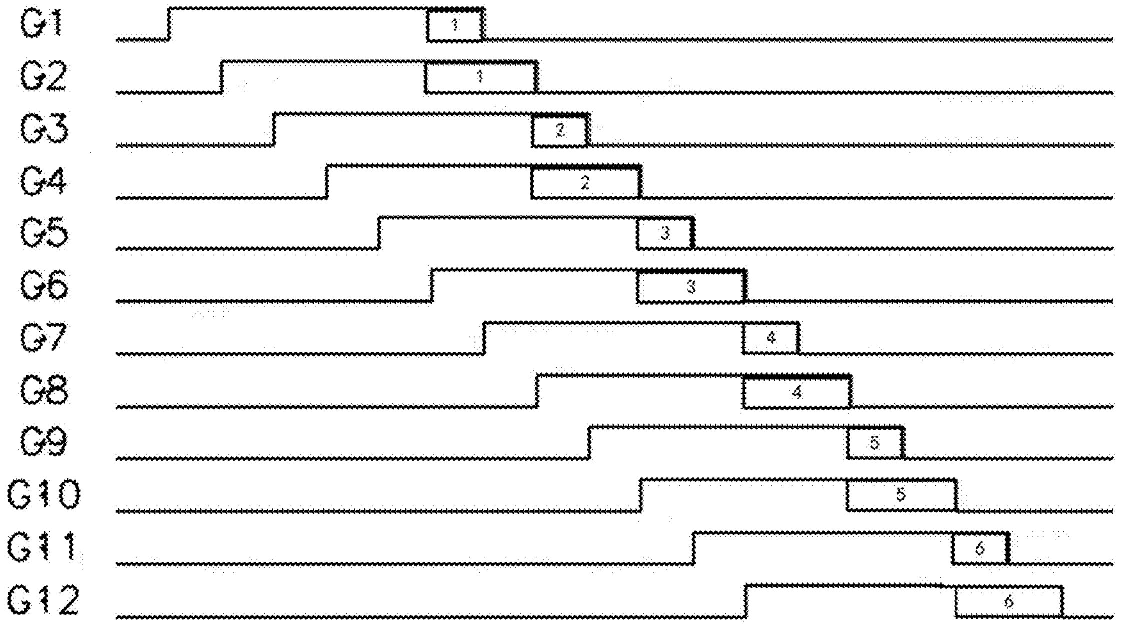
FIG. 1B shows a timing chart of the HSR pixel driving mode.

FIG. 1A shows a timing chart of a conventional pixel driving mode; and FIG. 1B shows a timing chart of the HSR pixel driving mode.

As shown in FIG. 1A, in the conventional pixel driving mode, a plurality of gate lines G1-G12 are turned on sequentially, and during the turn-on period of each gate line, data lines of all columns sequentially write data signals to each row of sub-pixels. For example, during the turn-on period of the gate line G1, the data lines write data signals 1 to one row of sub-pixels controlled by the gate line G1; after the gate line G1 is turned off, the data lines write the data signals 2 to another row of sub-pixels controlled by the gate line G2, and so on.

As shown in FIG. 1B, when the HSR mode is enabled, the timing sequence of the gate driving circuit is not changed, the charging of even rows are ensured, and the data of odd rows is a combination of adjacent two rows of data, so that the charging time of the data of even rows is doubled. For example, during the period when the gate lines G1 and G2 are simultaneously in the turn-on state, the data lines write data signals 1 to one row of sub-pixels controlled by the gate line G1 and write the data signals 1 to another row of sub-pixels controlled by the gate line G2; after the gate line G2 is turned off, the data lines write data signals 2 to two rows of sub-pixels controlled by the gate lines G3 and G4, and so on. The HSR pixel driving mode illustrated in this example can ensure that the charging of even rows is the same as that of the conventional mode, thereby achieving frequency doubling.

At present, HSR has been widely used in products with a single-gate pixel driving structure, but it is difficult to realize in a dual-gate pixel driving structure.

An embodiment of the present disclosure provides an array substrate, which can realize HSR technology in a dual-gate pixel driving structure. The array substrate includes a pixel array formed by a plurality of rows and a plurality of columns of sub-pixels, a plurality of gate lines and a plurality of data lines intersect to define the plurality of rows and the plurality of columns of sub-pixels, and two adjacent sub-pixels in each row of sub-pixels are respectively connected with two adjacent gate lines among the plurality of gate lines; at least one data line among the plurality of data lines is connected two adjacent columns of sub-pixels among the plurality of columns of sub-pixels; the plurality of gate lines are configured to turn on the plurality of rows of sub-pixels, and the plurality of data lines are configured to charge the plurality of columns of sub-pixels being turned on; the plurality of rows of sub-pixels include a plurality of groups of sub-pixels, each group of sub-pixels includes part of the plurality of rows of sub-pixels, and charging times of the part of the plurality of rows of sub-pixels are overlapped; the part of the plurality of rows of sub-pixels include a first part of the plurality of rows of sub-pixels and a second part of the plurality of rows of sub-pixels, the charging time of the second part of the plurality of rows of sub-pixels is longer than the charging time of the first part of the plurality of rows of sub-pixels; during a first time period in which the charging times overlap, a same data signal is written into the first part of the plurality of rows of sub-pixels and the second part of the plurality of rows of sub-pixels; during a second time period in which the charging times do not overlap, a data signal written into the second part of the plurality of rows of sub-pixels is at least partially the same as the data signal written during the first time period. In this embodiment, the dual-gate HSR technology is realized. In other embodiments of the present disclosure, not only can the dual-gate HSR technology be realized, but also the technical problem of color crosstalk caused by the application of HSR technology in the dual-gate pixel driving structure can be alleviated. Because each data line controls two columns of sub-pixels in the dual-gate pixel driving structure, it easily leads to a color crosstalk issue if HSR is directly used. For example, one data line controls one column of sub-pixels located on the left side of the data line and another column of sub-pixels located on the right side of the data line; a first sub-pixel (e.g., red sub-pixel) located on the left side of the data line in the first row of sub-pixels and a second sub-pixel (e.g., green sub-pixel) located on the right side of the data line in the first row of sub-pixels are respectively connected with a first gate line and a second gate line; when the first gate line and the second gate line are simultaneously turned on, the data line writes a data signal to both the first sub-pixel and the second sub-pixel simultaneously, resulting in a color crosstalk issue that green is also be displayed when red is displayed.

Figure 2A:
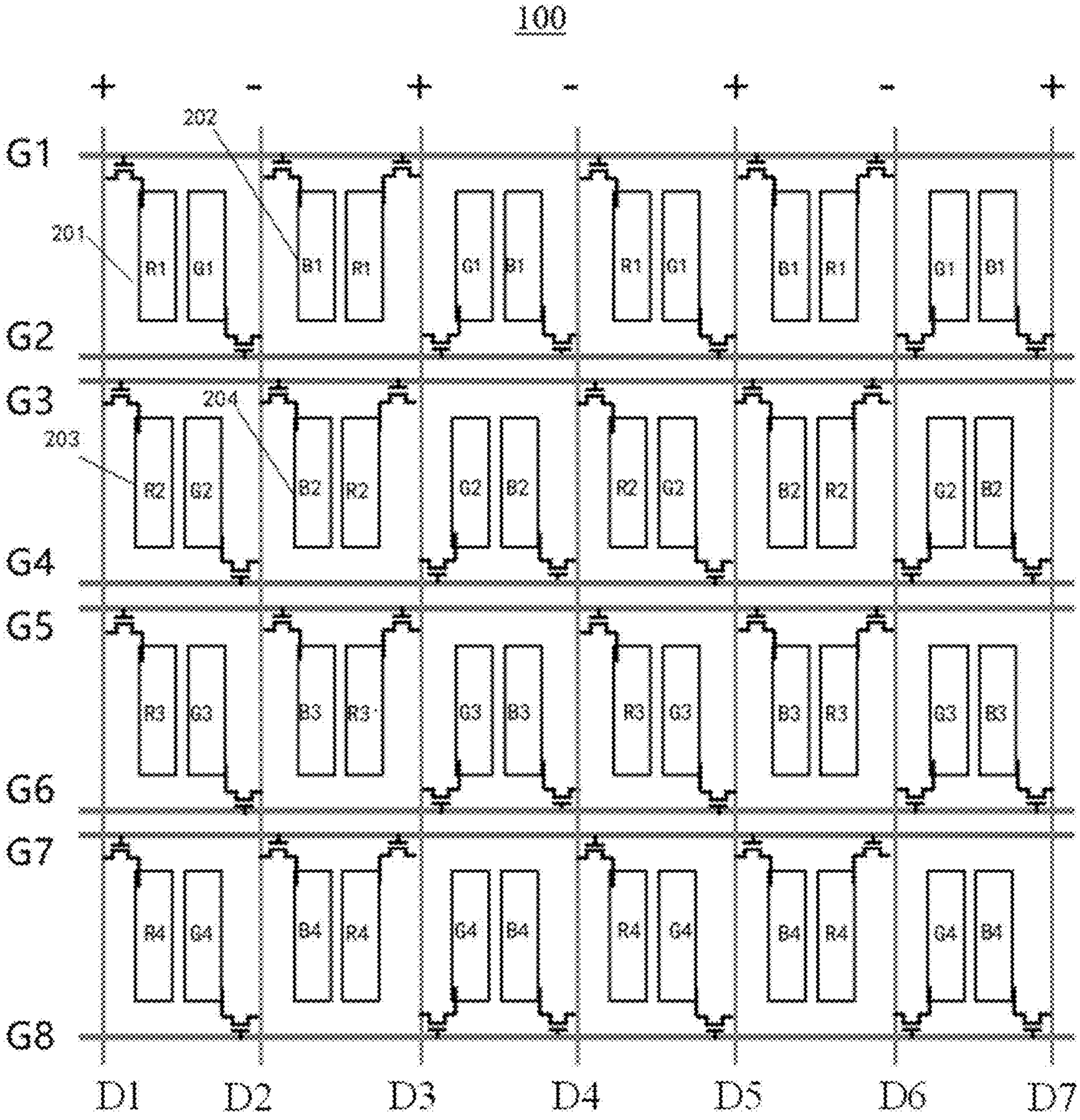
FIG. 2A shows a schematic diagram of an array substrate provided by at least one embodiment of the present disclosure.
Figure 2B:
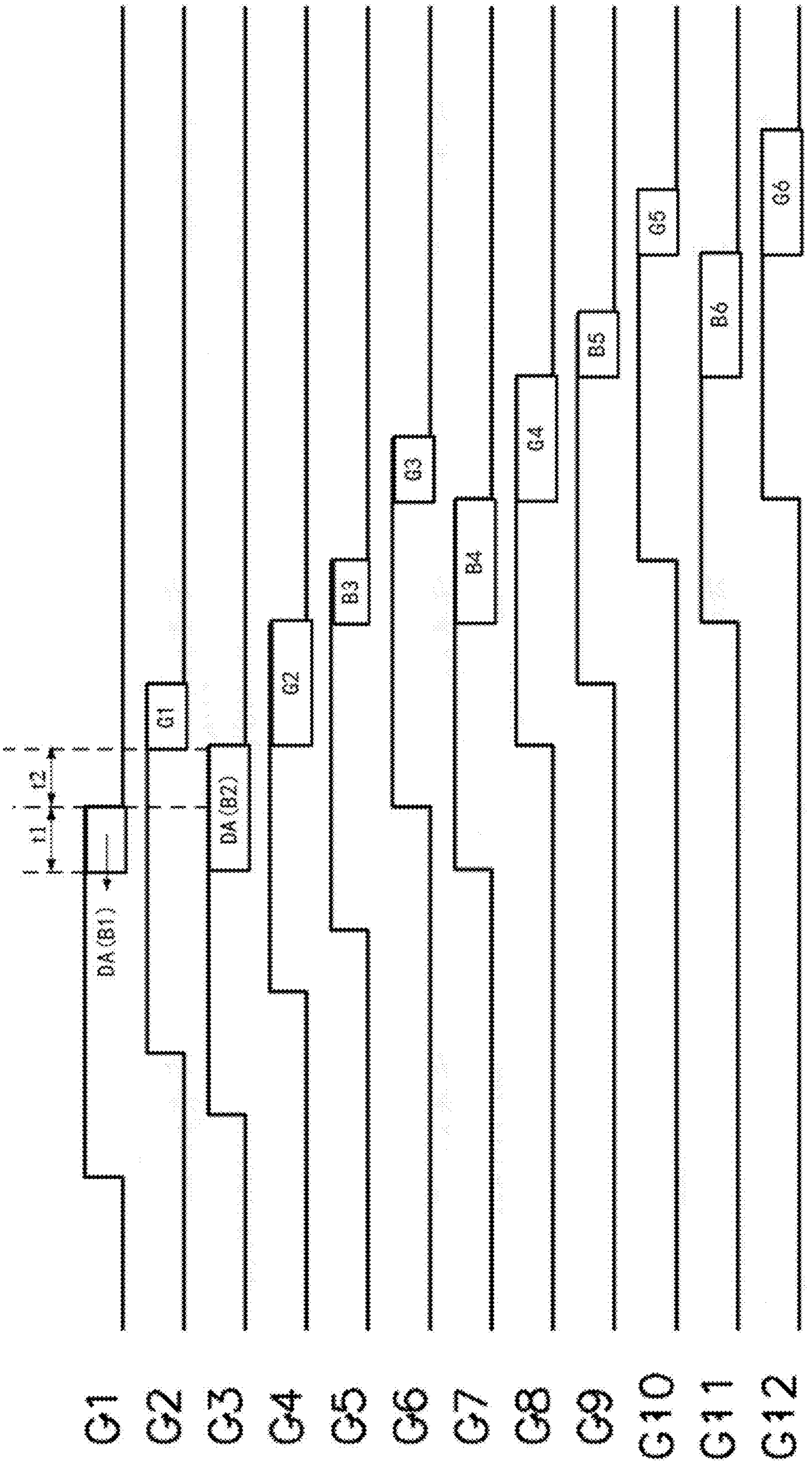
FIG. 2B shows a timing chart of the array substrate shown in FIG. 2A provided by at least one embodiment of the present disclosure.

FIG. 2A shows a schematic diagram of an array substrate provided by at least one embodiment of the present disclosure; and FIG. 2B shows a timing chart of the array substrate shown in FIG. 2A provided by at least one embodiment of the present disclosure.

As shown in FIG. 2A, the array substrate 100 includes a pixel array formed by a plurality of rows and a plurality of columns of sub-pixels. A plurality of gate lines and a plurality of data lines intersect to define the plurality of rows and the plurality of columns of sub-pixels. The plurality of gate lines may include, for example, gate lines G1-G8. The plurality of data lines may include, for example, data lines D1-D7.

It should be noted that although only 8 gate lines and 7 data lines are shown in FIG. 2A, it is merely an example. The array substrate may include fewer or more gate lines and data lines than the example of FIG. 2A. The array substrate may include more or fewer sub-pixels than the example of FIG. 2A.

Each sub-pixel needs polarity inversion driving. In the example of FIG. 2A, the pixel polarity inversion driving mode is column inversion driving mode, that is, the polarities of adjacent data lines are opposite. For example, the data signal on the first data line is positive, the data signal on the second data line is negative, and the data signal on the third data line is positive, and so on.

As shown in FIG. 2A, each row of sub-pixels in the array substrate 100 is connected with two adjacent gate lines among the plurality of gate lines.

For example, the i-th row of sub-pixels are connected with the N-th gate line and the (N+1)-th gate line (N is a positive integer), and the (i+1)-th row of sub-pixels are connected with the (N+2)-th gate line and the (N+3)-th gate line, and so on. Each row of sub-pixels are connected with two gate scan signal lines. Taking the first row of sub-pixels as an example, for example, from left to right, the sub-pixels are the first sub-pixel (located in the first column), the second sub-pixel (located in the second column), the third sub-pixel (located in the third column), the fourth sub-pixel (located in the fourth column), and so on. The gate line G1 is connected with the first sub-pixel, the third sub-pixel, the fourth sub-pixel, the seventh sub-pixel, the ninth sub-pixel and the tenth sub-pixel in this row. The gate line G2 is connected with the second sub-pixel, the fifth sub-pixel, the sixth sub-pixel, the eighth sub-pixel, the eleventh sub-pixel and the twelfth sub-pixel in this row. The connection relationship between other rows of sub-pixels and other gate lines is the same.

In other embodiments of the present disclosure, for example, two gate lines connected with the same row of sub-pixels include a gate line connected with one of even-column and odd-column sub-pixels in the corresponding row and a gate line connected with the other of the even-column and odd-column sub-pixels in the corresponding row. The embodiment of the present disclosure does not limit the connection relationship between each row of sub-pixels and two adjacent gate lines.

As shown in FIG. 2A, at least one data line among the plurality of data lines in the array substrate 100 is connected with two adjacent columns of sub-pixels among the plurality of columns of sub-pixels.

For example, the j-th data line is connected with the M-th column of sub-pixels and the (M+1)-th column of sub-pixels (M is a positive integer), and the (j+1)-th data line is connected with the (M+2)-th column of sub-pixels and the (M+3)-th column of sub-pixels, and so on. For example, as shown in FIG. 2, the second data line D2 is connected with the second column of sub-pixels and the third column of sub-pixels, the third data line D3 is connected with the fourth column of sub-pixels and the fifth column of sub-pixels, and other data lines are connected with other columns of sub-pixel in the same way. In this embodiment, the array substrate 100 may include data lines connected with only one column of sub-pixels in addition to data lines connected with two adjacent columns of sub-pixels among the plurality of columns of sub-pixels. For example, the first data line is connected with the first column of sub-pixels, and the last data line is connected with the last column of sub-pixels.

In the array substrate 100, the plurality of gate lines G1-G8 are configured to turn on the plurality of rows of sub-pixels, and the plurality of data lines D1-D7 are configured to charge the plurality of columns of sub-pixels that are turned on, that is, to write data signals to the plurality of columns of sub-pixels that are turned on.

As shown in FIG. 2A, in the embodiment of the present disclosure, Rx represents the red sub-pixel in the x-th row, x is an integer greater than or equal to 1; for example, x=1, and R1 represents the red sub-pixel in the first row. Similarly, Gx represents the green sub-pixel in the x-th row, and Bx represents the blue sub-pixel in the x-th row.

In the array substrate 100, the plurality of rows of sub-pixels include a plurality of groups of sub-pixels, each group of sub-pixels includes part of the plurality of rows of sub-pixels, and each row of sub-pixels among the part of the plurality of rows of sub-pixels includes sub-pixels connected with the same gate line, and charging times of the part of the plurality of rows of sub-pixels are overlapped.

In the embodiment of the present disclosure, a plurality of sub-pixels with overlapping charging times are taken as a group of sub-pixels. The overlapping of charging times means that data lines write data signals to two rows of sub-pixels simultaneously during a certain time period. The overlapping of charging times is illustrated in the example of FIG. 2B. For example, the gate line G1 and the gate line G3 shown in FIG. 2B, during the time period t1, the data lines write data signals to the sub-pixels turned on by the gate line G1 in the first row of sub-pixels and to the sub-pixels turned on by the gate line G3 in the third row of sub-pixels simultaneously, and this time period t1 is a time period in which the charging times overlap (that is, the high levels of G1 and G3 have overlapping parts). During the time period t2, the gate line G1 is turned off, and the data lines no longer write data signals to the sub-pixels controlled by the gate line G1 in the first row of sub-pixels, but still write data signals to the sub-pixels controlled by the gate line G3 in the third row of sub-pixels, and this time period t2 is a time period in which the charging times do not overlap (that is, a time period in which the high level of G1 and the high level of G3 do not overlap, and data signals are charged at the corresponding high level of G3). The time period t1 is an example of the first time period. The time period t2 is an example of the second time period.

For example, as shown in FIG. 2B, the charging time of sub-pixels connected with the gate line G1 overlaps with the charging time of sub-pixels connected with the gate line G3, so that the sub-pixels connected with the gate line G1 and the sub-pixels connected with the gate line G3 are taken as a group of sub-pixels. In this example, the charging time of sub-pixels connected with the gate line G1 overlaps with the charging time of sub-pixels connected with the gate line G3, then the sub-pixels connected with the gate line G1 and the sub-pixels connected with the gate line G3 are taken as a group of sub-pixels. In this example, the gate line G1 and the gate line G3 are taken as a group, and sub-pixels connected with these two gate lines are taken as one group of sub-pixels. In this example, part of the plurality of rows of sub-pixels are part of sub-pixels among the first row of sub-pixels connected with the gate line G1 (the first sub-pixel, the third sub-pixel, the fourth sub-pixel, the seventh sub-pixel, the ninth sub-pixel and the tenth sub-pixel in the first row) and part of sub-pixels among the third row of sub-pixels connected with the gate line G3 (the first sub-pixel, the third sub-pixel, the fourth sub-pixel, the seventh sub-pixel, the ninth sub-pixel and the tenth sub-pixel in the third row).

The part of the plurality of rows of sub-pixels include a first part of the plurality of rows of sub-pixels and a second part of the plurality of rows of sub-pixels, and the charging time of the second part of the plurality of rows of sub-pixels is longer than the charging time of the first part of the plurality of rows of sub-pixels. For example, in the example where the gate line G1 and the gate line G3 are taken as a group and sub-pixels connected with these two gate lines are taken as one group of sub-pixels, the first sub-pixel, the third sub-pixel, the fourth sub-pixel, the seventh sub-pixel, the ninth sub-pixel and the tenth sub-pixel in the first row are the first part of the plurality of rows of sub-pixels, and the first sub-pixel, the third sub-pixel, the fourth sub-pixel, the seventh sub-pixel, the ninth sub-pixel and the tenth sub-pixel in the third row are the second part of the plurality of rows of sub-pixels.

In some embodiments of the present disclosure, each group of sub-pixels includes two rows of sub-pixels, the first part of the plurality of rows of sub-pixels are at least part of sub-pixels among one row of sub-pixels of the two rows of sub-pixels, and the second part of the plurality of rows of sub-pixels are at least part of sub-pixels among the other row of sub-pixels of the two rows of sub-pixels.

In other embodiments of the present disclosure, each group of sub-pixels may include more than two rows of sub-pixels or one row of sub-pixels, and the present disclosure does not limit the number of sub-pixels of each group of sub-pixels.

In the array substrate 100, during the first time period in which the charging times overlap, a same data signal is written into the first part of the plurality of rows of sub-pixels and the second part of the plurality of rows of sub-pixels; and during a second time period in which the charging times do not overlap, a data signal written into the second part of the plurality of rows of sub-pixels is at least partially the same as the data signal written during the first time period.

As shown in FIG. 2B, during the time period t1 in which the charging times overlap, the data signal DA is written into sub-pixels connected with the gate line G1 in the first row of sub-pixels (hereinafter referred to as "G1 sub-pixels") and sub-pixels connected with the gate line G3 in the third row of sub-pixels (hereinafter referred to as "G3 sub-pixels"); during the time period t2 in which the charging times do not overlap, the data signal written into G3 sub-pixels is also the data signal DA.

In other embodiments of the present disclosure, during the time period t2 in which the charging times do not overlap, the data signal written into G3 sub-pixels may include data signal 1 and other data signals. That is, during the time period t2 in which the charging times do not overlap, the data signals written into the second part of the plurality of rows of sub-pixels may be completely the same as, or partly in the time period the same as and partly in the time period different from, those written during the first time period. FIG. 2B illustrates the case in which the data signals written into the second part of the plurality of rows of sub-pixels may be completely the same as those written during the first time period.

In the above example, taking that the first row of sub-pixels and the third row of sub-pixels serves as a pixel group as an example for illustration, the charging time and charging method of other pixel groups in the array substrate 100 are similar to those of this pixel group, and the details are not repeated here.

In other embodiments of the present disclosure, two rows of sub-pixels respectively corresponding to every two adjacent gate lines may also be taken as a pixel group; for example, the first row of sub-pixels and the second row of sub-pixels may be taken as a pixel group. Except for the overlapping of charging times, the present disclosure does not limit the division rules of pixel groups.

In some embodiments of the present disclosure, the charging time of the second part of the plurality of rows of sub-pixels is twice the charging time of the first part of the plurality of rows of sub-pixels. For example, the charging time of the first part of the plurality of rows of sub-pixels is a charging time of one row of sub-pixels, the charging time of the second part of the plurality of rows of sub-pixels is a charging time of two rows of sub-pixels, and the first part of the plurality of rows of sub-pixels and the second part of the plurality of rows of sub-pixels start being charged simultaneously. For example, the charging time of the first row of sub-pixels is the charging time 1H of one row of sub-pixels, and the charging time of the third row of sub-pixels is the charging time 2H of two rows of sub-pixels. For example, referring to FIG. 2B, the charging time corresponding to t1 is 1H, and the charging time corresponding to t2 is 1H, so for G3, the charging time of data signal B2 is 2H, which can improve the charging rate of the display panel for high-resolution products.

In some embodiments of the present disclosure, in the part of the plurality of rows of sub-pixels, the same data line is connected with sub-pixels corresponding to the same color. For example, in the part of the plurality of rows of sub-pixels, the same data line is connected with red sub-pixels, or green sub-pixels, or blue sub-pixels, which can alleviate the above-mentioned color crosstalk issue and realize the function of HSR at the same time.

It should be noted that in the embodiment of the present disclosure, color being the same or the same color means that the colors corresponding to the color filters are the same. Here, the color filters may be disposed on a counter substrate or the array substrate (COA technology, where the color filter layer is disposed on one side of the array substrate).

For example, in the timing chart shown in FIG. 2B, two gate lines are taken as a gate line group, two rows of sub-pixels respectively connected with the two gate lines in the gate line group form a sub-pixel group, and the sub-pixels connected with the same data line in the sub-pixel group correspond to the same color, so as to alleviate the color crosstalk issue.

For example, as shown in FIGS. 2A and 2B, the gate line G1 and the gate line G3 are a gate line group, and the G1 sub-pixels and the G3 sub-pixels form a sub-pixel group; in this sub-pixel group, two sub-pixels connected with the same data line correspond to the same color. For example, in this sub-pixel group, the sub-pixel 201 and the sub-pixel 203 connected with the data line D1 are both red sub-pixels; the sub-pixel 202 and the sub-pixel 204 connected with the data line D2 are both blue sub-pixels, and other data lines are similar to the data line D1 and the data line D2.

In the example of FIGS. 2A and 2B, a plurality of groups of gate lines are turned on sequentially, and a gate line connected with the first part of the plurality of rows of sub-pixels is turned on earlier than a gate line connected with the second part of the plurality of rows of sub-pixels. For example, in the example of FIG. 2B, every two adjacent odd rows of gate lines are taken as an odd gate line group, and every two adjacent even rows of gate lines are taken as an even gate line group, and the odd gate line group and the even gate line group alternate with each other. The first gate line group (gate line G1 and gate line G3), the second gate line group (gate line G2 and gate line G4), . . . , and the sixth gate line group (gate line G10 and gate line G12) are turned on sequentially. For each group of gate lines, for example, the gate line G1 and the gate line G3, the gate line G1 connected with the first part of the plurality of rows of sub-pixels (i.e., G1 sub-pixels) is turned on earlier than the gate line G3 connected with the second part of the plurality of rows of sub-pixels (i.e., G3 sub-pixels).

The array substrate shown in FIG. 2A adopts the timing sequence shown in FIG. 2B, which can alleviate the color crosstalk issue when applying HSR mode to the dual-gate pixel driving structure.

The main reason of display color crosstalk occurring when applying HSR mode to the dual-gate pixel driving structure is that the sub-pixels connected with the same data line and controlled by two adjacent rows of gate lines correspond to different colors. Therefore, the scanning sequence of the gate lines can be changed, so that the sub-pixels connected with the same data line and controlled by two adjacent rows of gate lines correspond to the same color, and the HSR display mode can be achieved. As shown in FIG. 2A, in the array substrate 100, for example, the sub-pixels in the same column have the same color; for example, the first column is red sub-pixels, the second column is green sub-pixels, and the third column is blue sub-pixels, and then it circulates in the order of red sub-pixels, green sub-pixels and blue sub-pixels. The normal turn-on sequence of gate lines is G1→G2→G3→G4→G5→G6→G7→G8; and for example, for data line D2, the corresponding turn-on sequence of sub-pixels is B1→G1→B2→G2→B3→G3→B4→G4 . . . ; in this case, because two adjacent turned-on sub-pixels correspond to different colors, there will be color crosstalk issue if the HSR display mode is directly enabled. As shown in FIG. 2B, in the embodiment of the present disclosure, the turn-on sequence of gate lines is G1→G3→G2→G4→G5→G7→G6→G8 . . . ; for example, for data line D2, the corresponding turn-on sequence of sub-pixels is B1 (blue sub-pixel)→B2 (blue sub-pixel)→G1 (green sub-pixel)→G2 (green sub-pixel)→B3 (blue sub-pixel)→B4 (blue sub-pixel)→G4 (green sub-pixel) . . . ; in this time, two adjacent turned-on sub-pixels correspond to the same color, and as long as it is ensured that HSR mode is enabled for charging of B2, G2, B4, G4 . . . , the color crosstalk issue may not occur, thus achieving applying the HSR display mode to the dual-gate pixel driving structure.

In other embodiments of the present disclosure, the same data line is connected with a plurality of groups of sub-pixels, and a plurality of sub-pixels corresponding to the same color and connected with the same data line are connected with odd rows of gate lines or even rows of gate lines. It should be noted that the odd and even rows here are not absolute, and may refer to two adjacent rows of gate lines, where one is an odd row and the other is an even row.

For example, a plurality of green sub-pixels connected with the same data line D2 are all connected with even rows of gate lines, and a plurality of blue sub-pixels connected with the same data line D2 are all connected with odd rows of gate lines.

In some embodiments of the present disclosure, a plurality of sub-pixels corresponding to red are connected with the odd rows of gate lines, a plurality of sub-pixels corresponding to green are connected with the even rows of gate lines, and a plurality of sub-pixels corresponding to blue and connected with the same data line are connected with a plurality of odd rows of gate lines or a plurality of even rows of gate lines. As shown in FIG. 2A, all red sub-pixels are connected with and controlled by odd rows of gate lines, all green sub-pixels are connected with and controlled by even rows of gate lines, and blue sub-pixels connected with the same data line are only connected with and controlled by odd rows of gate lines or even rows of gate lines. For example, the third column of sub-pixels are blue sub-pixels, and the blue sub-pixels in the third column are only connected with odd rows of gate lines; the sixth column of sub-pixels are blue sub-pixels, and the blue sub-pixels in the sixth column are only connected with even rows of gate lines.

Figure 3A:
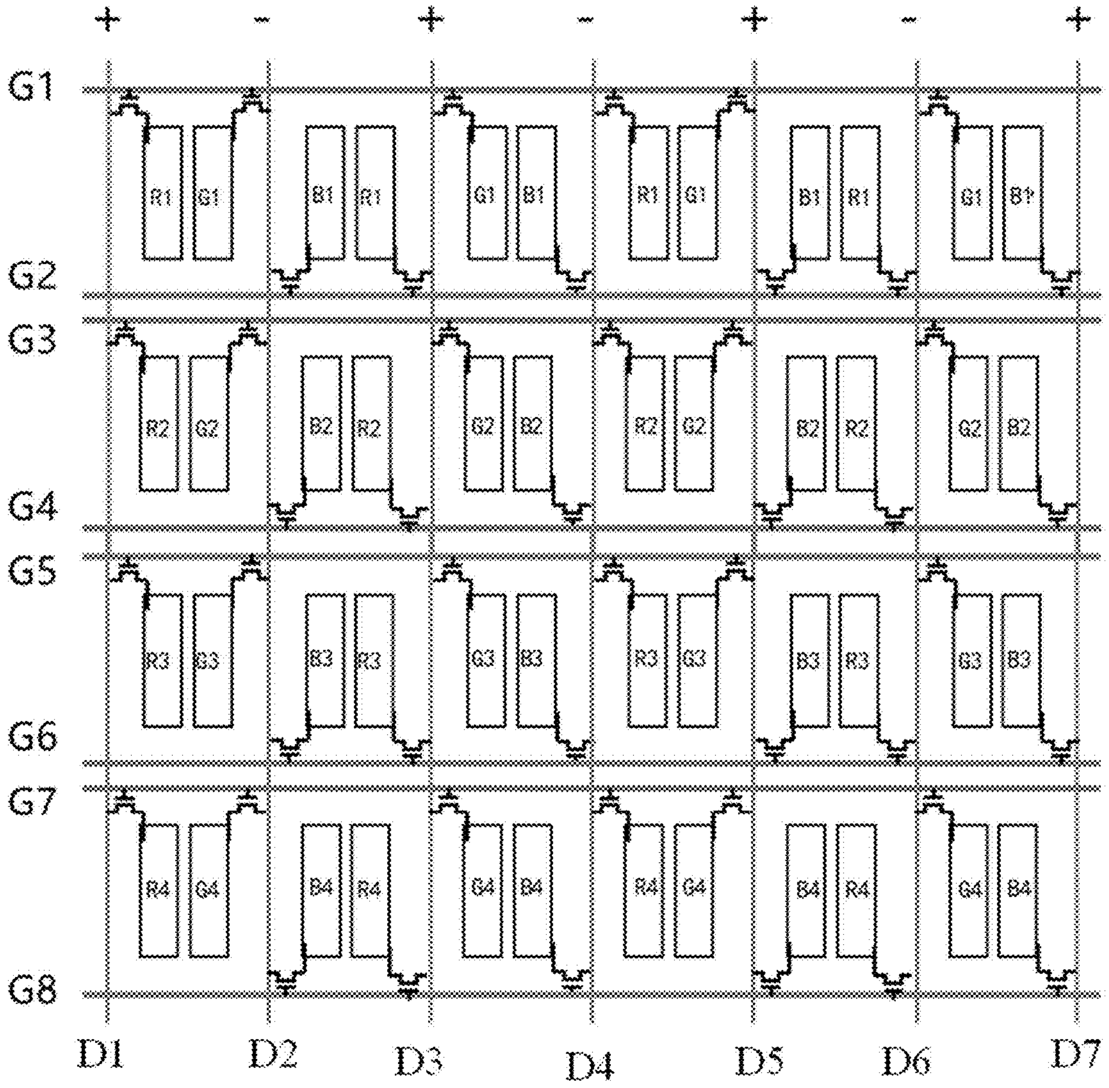
FIG. 3A shows a schematic diagram of another array substrate provided by some embodiments of the present disclosure.

FIG. 3A shows a schematic diagram of another array substrate provided by some embodiments of the present disclosure.

As shown in FIG. 3A, in this embodiment, a plurality of sub-pixels corresponding to green are connected with the odd rows of gate lines, a plurality of sub-pixels corresponding to blue are connected with the even rows of gate lines, and a plurality of sub-pixels corresponding to red and connected with the same data line are connected with a plurality of odd rows of gate lines or a plurality of even rows of gate lines. For example, the fourth column of sub-pixels are red sub-pixels, and the red sub-pixels in the fourth column are only connected with even rows of gate lines; the first column of sub-pixels are red sub-pixels, and the red sub-pixels in the first column are only connected with odd rows of gate lines.

Figure 3B:
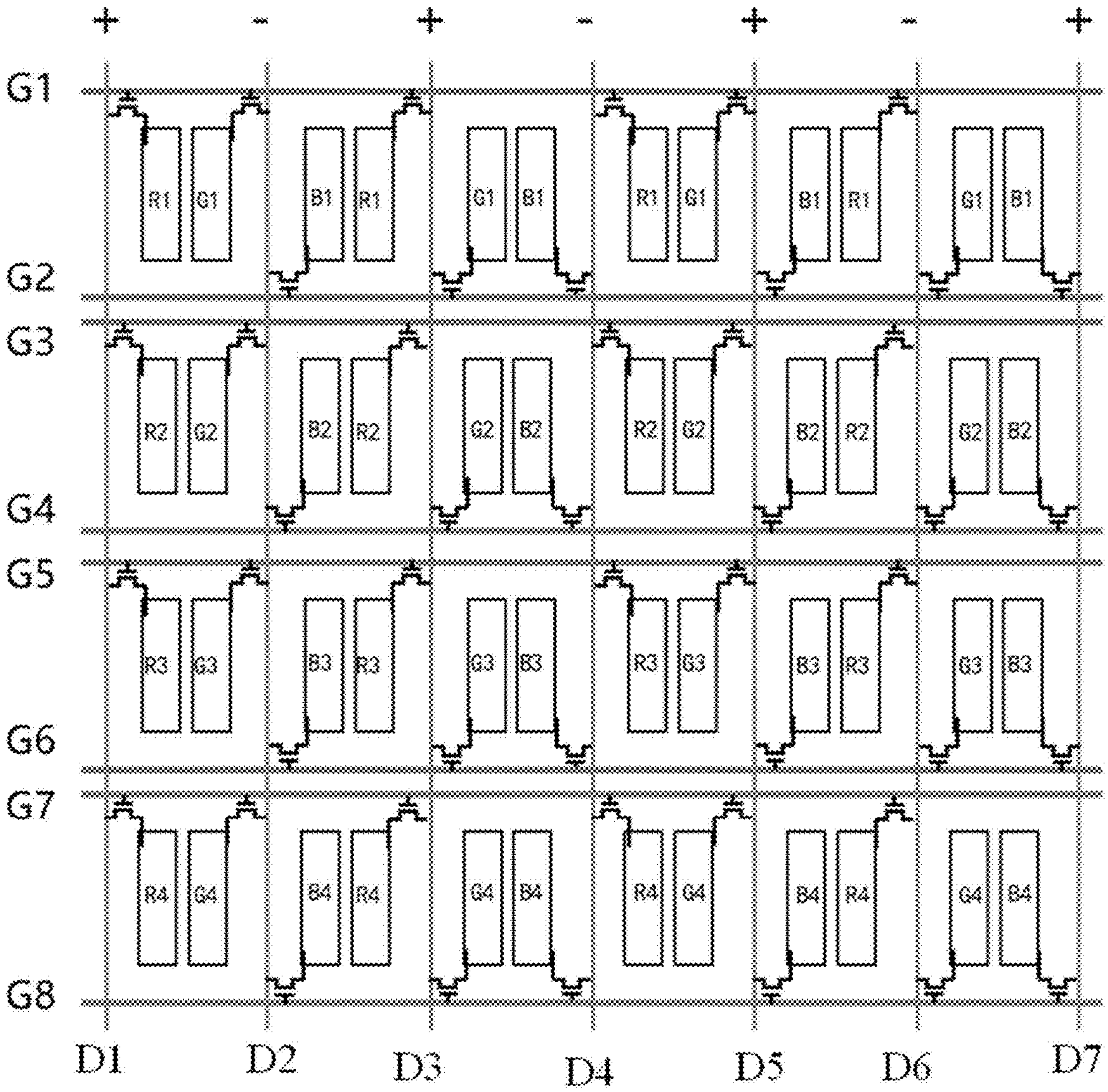
FIG. 3B shows a schematic diagram of another array substrate provided by some embodiments of the present disclosure.

FIG. 3B shows a schematic diagram of another array substrate provided by some embodiments of the present disclosure.

As shown in FIG. 3B, in this embodiment, a plurality of sub-pixels corresponding to red are connected with the odd rows of gate lines, a plurality of sub-pixels corresponding to blue are connected with the even rows of gate lines, and a plurality of sub-pixels corresponding to green and connected with the same data line are connected with a plurality of odd rows of gate lines or a plurality of even rows of gate lines. For example, the second column of sub-pixels are green sub-pixels, and the green sub-pixels in the second column are only connected with odd rows of gate lines; the fifth column of sub-pixels are green sub-pixels, and the green sub-pixels in the fifth column are only connected with even rows of gate lines.

Figure 3C:
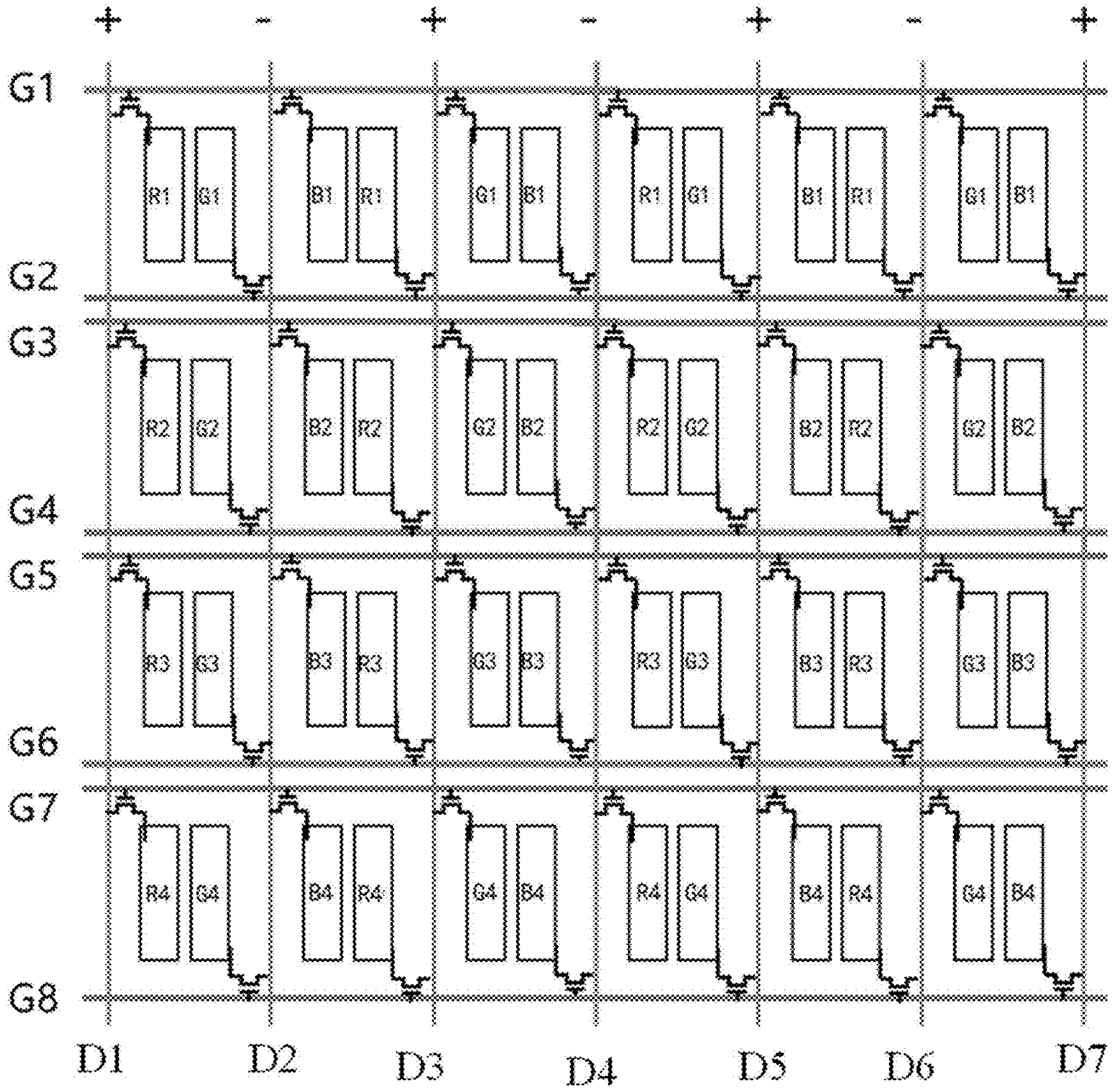
FIG. 3C shows a schematic diagram of another array substrate provided by some embodiments of the present disclosure.

FIG. 3C shows a schematic diagram of another array substrate provided by some embodiments of the present disclosure.

As shown in FIG. 3C, in this embodiment, sub-pixels in the same column correspond to the same color, a plurality of sub-pixels corresponding to red and connected with the same data line are connected with a plurality of odd rows of gate lines or a plurality of even rows of gate lines, a plurality of sub-pixels corresponding to green and connected with the same data line are connected with a plurality of odd rows of gate lines or a plurality of even rows of gate lines, and a plurality of sub-pixels corresponding to blue and connected with the same data line are connected with a plurality of odd rows of gate lines or a plurality of even rows of gate lines. For example, the fourth column of sub-pixels are red sub-pixels, and the red sub-pixels in the fourth column are only connected with even rows of gate lines; the first column of sub-pixels are red sub-pixels, and the red sub-pixel in the first column are only connected with odd rows of gate lines. For example, the second column of sub-pixels are green sub-pixels, and the green sub-pixels in the second column are only connected with odd rows of gate lines; the fifth column of sub-pixels are green sub-pixels, and the green sub-pixel in the fifth column are only connected with even rows of gate lines. For example, the third column of sub-pixels are blue sub-pixels, and the blue sub-pixels in the third column are only connected with odd rows of gate lines; the sixth column of sub-pixels are blue sub-pixels, and the blue sub-pixel in the sixth column are only connected with even rows of gate lines.

The array substrates shown in FIGS. 3A-3C can all be driven by using the timing chart shown in FIG. 2B.

Figure 4:
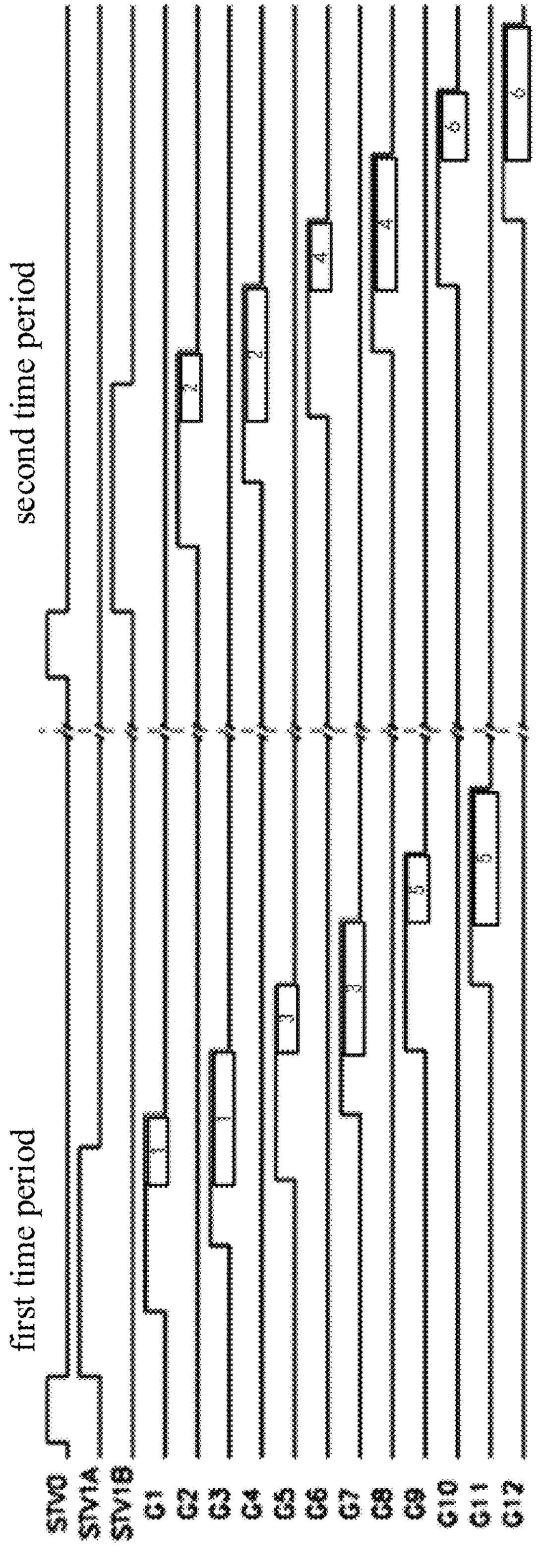
FIG. 4 shows a timing chart of another driving method applied to the array substrate shown in FIGS. 2A and 3A-3C provided by some embodiments of the present disclosure.

FIG. 4 shows a timing chart of another driving method applied to the array substrate shown in FIGS. 2A and 3A-3C provided by some embodiments of the present disclosure.

In this example, an image frame is divided into a first display period and a second display period, two adjacent odd rows of gate lines are taken as a group, two adjacent even rows of gate lines are taken as a group, and two rows of sub-pixels connected with each group of gate lines are taken as a group of sub-pixels. For odd rows of gate lines, a plurality of groups of odd rows of gate lines are sequentially turned on in the first display period; for even rows of gate lines, a plurality of groups of eve rows of gate lines are sequentially turned on in the second display period; and in each group of gate lines, a gate line connected with the first part of the plurality of rows of sub-pixels is turned on earlier than a gate line connected with the second part of the plurality of rows of sub-pixels.

In some embodiments of the present disclosure, the time lengths of the first display period and the second display period are the same. For example, an image frame is divided into a first half frame and a second half frame on average, the display period of the first half frame is the first display period, and the display period of the second half frame is the second display period. Optionally, a display frame may include the first display period, the second period and a blanking period, which is not limited here. In other embodiments of the present disclosure, the time lengths of the first display period and the second display period are different.

For example, as shown in FIG. 2A and FIGS. 3A-3C, odd rows of gate lines include the gate line G1, the gate line G3, the gate line G5, the gate line G7, the gate line G9 and the gate line G11, and every two adjacent odd rows of gate lines are taken as a group; for example, the gate line G1 and the gate line G3 are taken as a group, the gate line G5 and the gate line G7 are taken as a group, and the gate line G9 and the gate line G11 are taken as a group. The plurality of groups of odd rows of gate lines are turned on sequentially in the first half frame. For example, even rows of gate lines include the gate line G2, the gate line G4, the gate line G6, the gate line G8, the gate line G10 and the gate line G12, and every two adjacent even rows of gate lines are taken as a group; for example, the gate line G2 and the gate line G4 are taken as a group, the gate line G6 and the gate line G8 are taken as a group, the gate line G10 and the gate line G12 are taken as a group. The plurality of groups of even rows of gate lines are turned on sequentially in the second half frame.

As shown in FIG. 4, in the display period of the first half frame, the gate lines G1, G3, G5, G7, G9 and G11 are turned on sequentially, and the gate lines G2, G4, G6, G8, G10 and G12 are kept in an off state. In the display period of the second half frame, the gate lines G1, G3, G5, G7, G9 and G11 are kept in an off state, and the gate lines G2, G4, G6, G8, G10 and G12 are turned on sequentially. In the first half frame, the STV1A initial trigger signal is enabled, and in the second half frame, the STV1B initial trigger signal is enabled. The initial trigger signal is provided to the input module(s) of the first row or the first few rows of gate driving circuit(s), and is configured to turn on the first row or the first few rows of gate driving circuit(s). For example, STV1A can turn on the G1 row or simultaneously turn on the G1 and G3 rows; and for example, STV1B can turn on the G2 row, or simultaneously turn on the G2 and G4 rows, which is not limited here.

For each group of gate lines, the first part of the plurality of rows of sub-pixels are sub-pixels with a relatively small sequence number, and the second part of the plurality of rows of sub-pixels are sub-pixels with a relatively large sequence number. For example, in the gate line group consisting of the gate line G5 and the gate line G7, the sub-pixels connected with the gate line G5 is the first part of the plurality of rows of sub-pixels, and the sub-pixels connected with the gate line G7 is the second part of the plurality of rows of sub-pixels; in the gate line group consisting of the gate line G2 and the gate line G4, the sub-pixels connected with the gate line G2 is the first part of the plurality of rows of sub-pixels, and the sub-pixels connected with the gate line G4 is the second part of the plurality of rows of sub-pixels; and the cases of other gate line groups are similar thereto.

In the example of FIG. 4, odd rows are turned on during the first half frame, and even rows are turned on during the second half frame. In other embodiments of the present disclosure, even rows can be turned on during the first half frame, and odd rows can be turned on during the second half frame.

For the pixel architectures of FIGS. 2A and 3A-3C, when only odd rows or even rows of gate lines are turned on, the sub-pixels connected with the same data line correspond to the same color; and when HSR mode is enabled for odd rows of gate lines and even rows of gate lines, respectively, the color crosstalk issue may not occur. Therefore, for example, one frame of time is divided into a first half frame and a second half frame, odd rows of gate lines are turned on during the first half frame, even rows of gate lines are turned on during the second half frame, and then the HSR display mode is enabled for odd rows of gate lines and even rows of gate lines, respectively (see FIG. 4 for the timing sequence), thus achieving applying the HSR display mode to the dual-gate pixel driving structure.

In the example of FIG. 4, the gate lines connected with the odd rows and the gate lines connected with the even rows are controlled separately, so that the odd rows can be driven during the first half frame according to the HSR model, and the even rows can be driven during the second half frame according to the HSR model. Moreover, sub-pixels of the same color connected with each data line are all controlled by odd rows of gate lines or even rows of gate lines, and therefore, the color crosstalk issue can be alleviated. Referring to FIG. 4, during the overlapping time period of high levels of G1 and G3, the data signal being charged is data signal 1, and during the non-overlapping time period of high levels of G1 and G3, the data signal being charged is also the data signal 1, that is, the same data signal is charged. Optionally, The overlapping time period of high levels of G1 and G3 is 1H (one-row charging time), and during the non-overlapping time period of high levels of G1 and G3, the charging time is 1H, that is, the data signal 1 can be charged into G3 for a total of 2H, which improves the display charging time and addresses the issue of insufficient charging rate. The cases of other odd rows or even rows are similar thereto, which are not repeated here.

It should be noted that the array substrates shown in FIGS. 3A-3C are similar to the array substrate shown in FIG. 2A in other structures except that the red sub-pixels, the blue sub-pixels and the green sub-pixels are connected with gate lines in different ways.

Figure 5A:
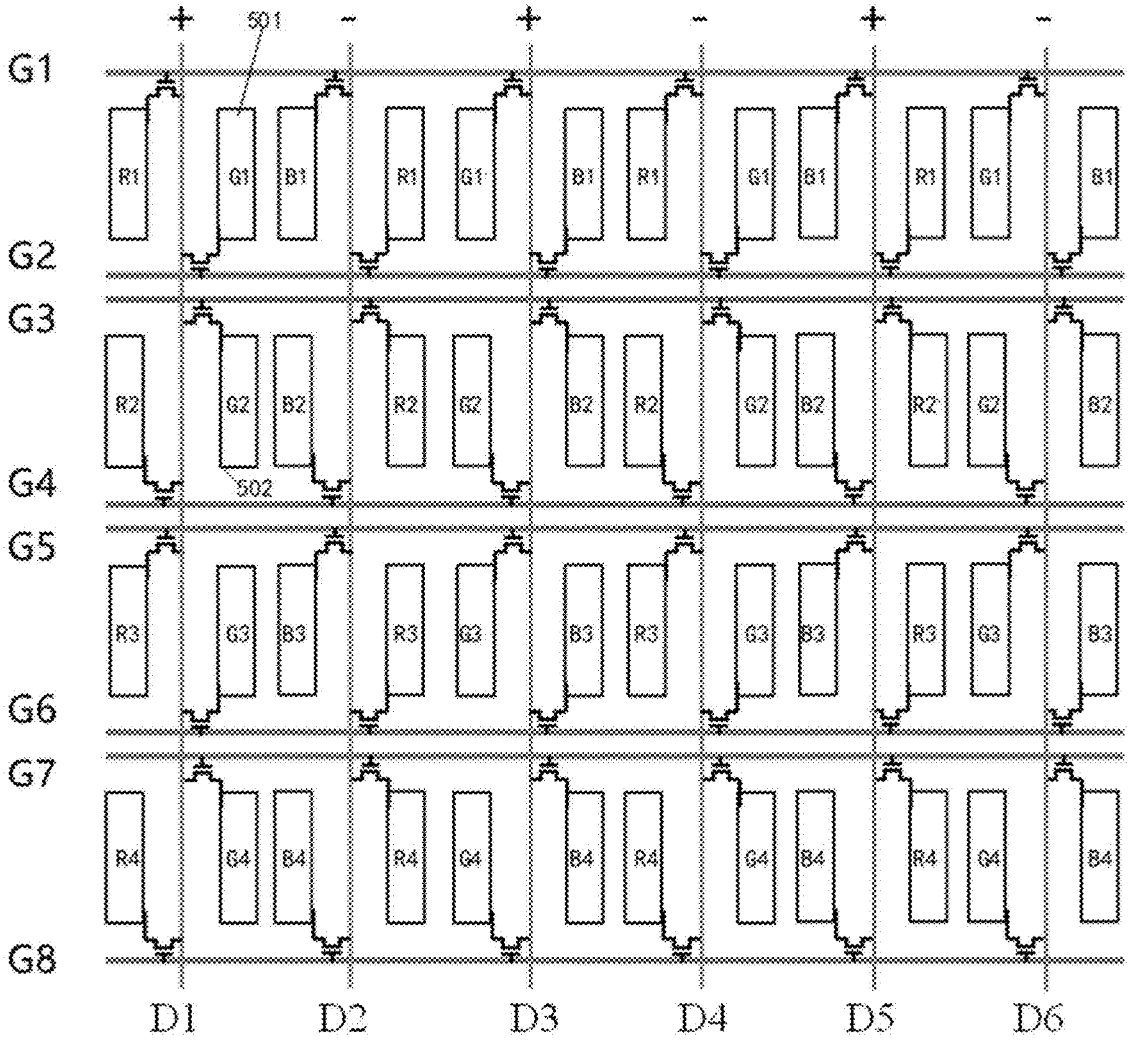
FIG. 5A shows a schematic diagram of another array substrate provided by at least one embodiment of the present disclosure.
Figure 5B:
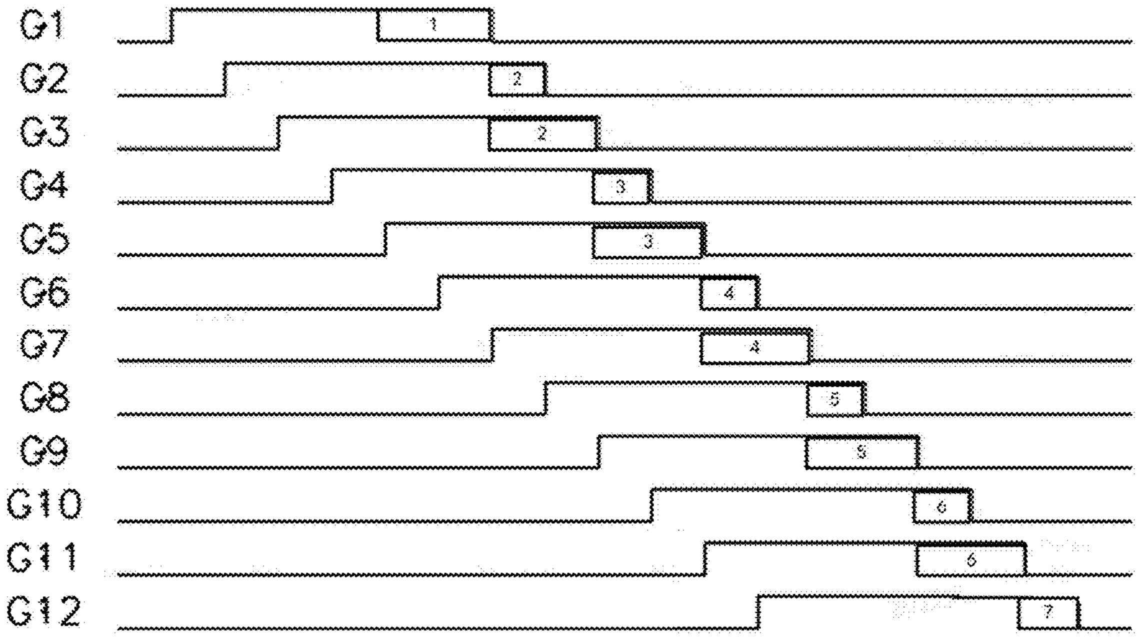
FIG. 5B shows a timing chart of a driving method applied to the array substrate shown in FIG. 5A provided by at least one embodiment of the present disclosure.

FIG. 5A shows a schematic diagram of another array substrate 500 provided by at least one embodiment of the present disclosure. FIG. 5B shows a timing chart of a driving method applied to the array substrate shown in FIG. 5A provided by at least one embodiment of the present disclosure.

As shown in FIG. 5A, the array substrate 500 includes a plurality of gate lines G1-G8. The plurality of gate lines G1-G8 include a plurality of first gate line groups, each first gate line group includes two adjacent gate lines, and two rows of sub-pixels connected with each first gate line form a first sub-pixel group.

In the example of FIG. 5A, in the same row, sub-pixels in odd columns are connected with the same gate line, and sub-pixels in even columns are connected with the same gate line. For example, in the first row, the sub-pixels in odd columns are connected with the gate line G1, and the sub-pixels in even columns are connected with the gate line G2; in the second row, the sub-pixels in odd columns are connected with the gate line G4, and the sub-pixels in even columns are connected with the gate line G3. For example, the gate line G2 and the gate line G3 are taken as a first gate line group, and a plurality of sub-pixels in the first row of sub-pixels and connected with the gate line G2 (the plurality of sub-pixels located in even columns) and a plurality of sub-pixels in the second row of sub-pixels and connected with the gate line G3 (the plurality of sub-pixels located in even columns) form a first sub-pixel group; the gate line G4 and the gate line G5 are taken as a first gate line group, and a plurality of sub-pixels in the second row of sub-pixels and connected with the gate line G4 (the plurality of sub-pixels located in odd columns) and a plurality of sub-pixels in the third row of sub-pixels and connected with the gate line G5 (the plurality of sub-pixels located in odd columns) form a first sub-pixel group. Other first gate line groups and first sub-pixel groups are similar to the above.

It should be noted that in the embodiments of the present disclosure, odd columns are relative to even columns, one of two adjacent columns is an odd column and the other is an even column, and the odd columns and the even columns alternate in the pixel array.

In the example of FIG. 5A, two sub-pixels connected with the same data line in each first sub-pixel group correspond to the same color. For example, for the first gate line group formed of the gate line G2 and the gate line G3, the sub-pixel 501 of the second column in the first row connected with the gate line G2 and the sub-pixel 502 of the second column in the second row connected with the gate line G3 are connected with the same data line, and both the sub-pixel 501 and the sub-pixel 502 are green sub-pixels. That is, in the embodiment of the present disclosure, for example, the DN-th data line is connected with Pn-th and P(n+1)-th columns of sub-pixels, and the gate line Gi, sub-pixels respectively corresponding to the gate line Gi+1 (where i is greater than or equal to 2), the gate line Gi+3 and the gate line Gi+2 are connected to the DN-th data line. The gate line Gi and the gate line Gi+1 correspond to the P(n+1)-th column of sub-pixels with the same color, and the gate line Gi+3 and the gate line Gi+2 correspond to the Pn-th column of sub-pixels with the same color, and so on; or, the gate line Gi and the gate line Gi+1 correspond to the Pn-th column of sub-pixels with the same color, and the gate line Gi+3 and the gate line Gi+2 correspond to the P(n+1)-th column of sub-pixels with the same color, and so on.

In the example of FIG. 5A, the plurality of groups of sub-pixels can further include a second sub-pixel group, the second sub-pixel group includes a plurality of sub-pixels connected with a gate line firstly turned on among the plurality of gate lines, and the plurality of first sub-pixel groups include a plurality of rows of sub-pixels other than sub-pixels included in the second sub-pixel group. For example, as shown in FIG. 5B, the gate line firstly turned on among the plurality of gate lines is the gate line G1, and a plurality of sub-pixels connected with the gate line GI (the plurality of sub-pixels located in odd columns) are taken as the second sub-pixel group. Except for the plurality of sub-pixels connected with the gate line G1, the plurality of rows of sub-pixels are divided into a plurality of first sub-pixel groups.

As shown in FIG. 5B, the HSR display mode may be applied starting from the gate line G2, that is, after the gate line G1 is turned on and the data signal 1 is written into the second sub-pixel group, the HSR display mode is applied. In the HSR display mode, the plurality of gate lines are sequentially turned on, and in each group of sub-pixels, the gate line connected with the first part of the plurality of rows of sub-pixels is turned on earlier than the gate line connected with the second part of the plurality of rows of sub-pixels. For example, the gate line G2 is turned on earlier than the gate line G3, the gate line G4 is turned on earlier than the gate line G5, and so on. For example, referring to FIG. 5B, when G1 is turned on, a data signal is correspondingly charged into the first row of pixels, the data signal 1 is charged, and the charging time of the data signal may be 2H, that is, the charging time of 2 rows of pixels (it should be noted that the charging time of the data signal written into the first row of pixels may also be 1H, which is not limited here). The HSR mode is enabled from the second row gate line and for subsequent gate lines, that is, G2 is turned on to charge data signal 2, and the charging time of data signal 2 is 1H; after G3 is turned on, data signal 2 is charged during the non-overlapping part of timing sequences of G3 and G2 with a charging time of 1H, that is, data signal is charged into G3 for a total of 2H; and the signal feeding method of G4 and G5, or G6 and G7, etc., can refer to the signal feeding method of G2 and G3, which is not repeated here.

As shown in FIG. 5B, for each group of sub-pixels, the data line starts to write the same data signal to the plurality of sub-pixels included in each group of sub-pixels simultaneously; for example, the same data signal 2 is written into the pixel group corresponding to the gate line G2 and the gate line G3. For example, the charging time of the plurality of sub-pixels connected with the gate line G2 is 1H, and the charging time of the plurality of sub-pixels connected with the gate line G3 is 2H, and these charging times overlap by 1H.

In the examples of FIGS. 5A and 5B, the turn-on sequence of gate lines is G1→G2→G3→G4→G5→G6→G7→G8 . . . ; for example, for data line D2, the turn-on sequence of multiple sub-pixels is B1→R1→R2→B2→B3→R3→R4; in this case, two adjacent turned-on sub-pixels correspond to the same color, and as long as it is ensured that HSR mode is enabled for charging of sub-pixels of R2, B3 and R4, the color crosstalk issue may not occur, thus achieving applying the HSR display mode to the dual-gate pixel driving structure.

Another aspect of the present disclosure provides a driving method. The driving method is applied to the array substrate provided by any embodiment of the present disclosure. The driving method includes: turning on a plurality of gate lines connected with each group of sub-pixels; and charging, during a period when the plurality of gate lines of each group of sub-pixels are turned on, each group of sub-pixels by a plurality of data lines. In this embodiment, the dual-gate HSR technology is achieved. In other embodiments of the present disclosure, not only the dual-gate HSR technology can be achieved, but also the technical problem of color crosstalk caused by applying HSR technology in the dual-gate pixel driving structure can be alleviated.

Some embodiments of the present disclosure provide a driving method applied to, for example, the array substrates illustrated in FIGS. 2A and 3A-3C above. As shown in FIGS. 2A and 3A-3C, a same data line is connected with the plurality of groups of sub-pixels, and a plurality of sub-pixels having a same luminous color and connected with the same data line are connected with odd rows of gate lines or even rows of gate lines.

In this example, an image frame is divided into a first display period and a second display period, two adjacent odd rows of gate lines are taken as a group, two adjacent even rows of gate lines are taken as a group, and two rows of sub-pixels connected with each group of gate lines are taken as a group of sub-pixels; during the first display period, odd rows of gate lines are turned on sequentially, and during the second display period, even rows of gate lines are turned on sequentially; and in each group of gate lines, a gate line connected with the first part of the plurality of rows of sub-pixels is turned on earlier than a gate line connected with the second part of the plurality of rows of sub-pixels.

In some embodiments of the present disclosure, the time lengths of the first display period and the second display period are the same. For example, an image frame is divided into a first half frame and a second half frame on average, the display period of the first half frame is the first display period, and the display period of the second half frame is the second display period. In other embodiments of the present disclosure, the time lengths of the first display period and the second display period are different.

This driving method drives, for example, according to the timing sequence shown in FIG. 4. For example, during the display period of the first half frame, the gate lines G1, G3, G5, G7, G9 and G11 are tumed on sequentially, and the gate lines G2, G4, G6, G8, G10 and G12 are kept in an off state. During the display period of the second half frame, the gate lines G1, G3, G5, G7, G9 and G11 are kept in an off state, and the gate lines G2, G4, G6, G8, G10 and G12 are turned on sequentially.

For each group of gate lines, the first part of the plurality of rows of sub-pixels are sub-pixels with a relatively small sequence number, and the second part of the plurality of rows of sub-pixels are sub-pixels with a relatively large sequence number. For example, in the gate line group consisting of the gate line G5 and the gate line G7, the sub-pixels connected with the gate line G5 is the first part of the plurality of rows of sub-pixels, and the sub-pixels connected with the gate line G7 is the second part of the plurality of rows of sub-pixels; in the gate line group consisting of the gate line G2 and the gate line G4, the sub-pixels connected with the gate line G2 is the first part of the plurality of rows of sub-pixels, and the sub-pixels connected with the gate line G4 is the second part of the plurality of rows of sub-pixels; and other gate line groups are similar thereto.

In the example of FIG. 4, odd rows are turned on during the first half frame, and even rows are turned on during the second half frame. In other embodiments of the present disclosure, even rows may be turned on during the first half frame, and odd rows may be turned on during the second half frame.

For the pixel architectures of FIGS. 2A and 3A-3C, when only odd rows or even rows of gate lines are turned on, the sub-pixels connected with the same data line correspond to the same color; and when HSR mode is enabled for odd rows of gate lines and even rows of gate lines, respectively, the color crosstalk issue cannot occur. Therefore, for example, one frame of time is divided into a first half frame and a second half frame, odd rows of gate lines are turned on during the first half frame, even rows of gate lines are turned on during the second half frame, and then the HSR display mode is enabled for odd rows of gate lines and even rows of gate lines, respectively (see FIG. 4 for the timing sequence), thus achieving applying the HSR display mode to the dual-gate pixel driving structure.

In some embodiments of the present disclosure, the charging time of the first part of the plurality of rows of sub-pixels is a charging time of one row of sub-pixels, the charging time of the part of the plurality of rows of sub-pixels is a charging time of two rows of sub-pixels, and the first part of the plurality of rows of sub-pixels and the second part of the plurality of rows of sub-pixels start being charged simultaneously.

Some embodiments of the present disclosure provide another driving method applied to, for example, the array sub strates illustrated in FIGS. 2A and 3A-3C above. As shown in FIGS. 2A and 3A-3C, two gate lines are taken as a gate line group, two rows of sub-pixels respectively connected with the two gate lines in the gate line group form a sub-pixel group, and sub-pixels connected with the same data line in the sub-pixel group correspond to a same luminous color.

The driving timing sequence of this driving method is, for example, the timing sequence illustrated in FIG. 2B. A plurality of groups of gate lines are sequentially turned on, and for each group of gate lines, a gate line connected with the first part of the plurality of rows of sub-pixels is turned on earlier than a gate line connected with the second part of the plurality of rows of sub-pixels.

Some embodiments of the present disclosure provide a driving method applied to, for example, the array substrate illustrated in FIG. 5A above.

For the array substrate shown in FIG. 5A, the plurality of gate lines include a plurality of first gate line groups, each group of sub-pixels includes two adjacent rows of sub-pixels, each first gate line group includes two adjacent gate lines, and two sub-pixels connected with a same data line in each first sub-pixel group correspond to a same color. The driving timing sequence of this driving method is, for example, the timing sequence illustrated in FIG. 2B. Each gate line is turned on sequentially, and a gate line connected with the first part of the plurality of rows of sub-pixels is turned on earlier than a gate line connected with the second part of the plurality of rows of sub-pixels.

The driving methods provided by the embodiments of the present disclosure correspond to the features described in the aforementioned array substrates. For the driving method, reference can be made to the related description of the array substrate, and the details are not repeated here.

Some other embodiments of the present disclosure further provide a display device. The display device includes the array substrate provided by any embodiment of the present disclosure.

Figure 6A:
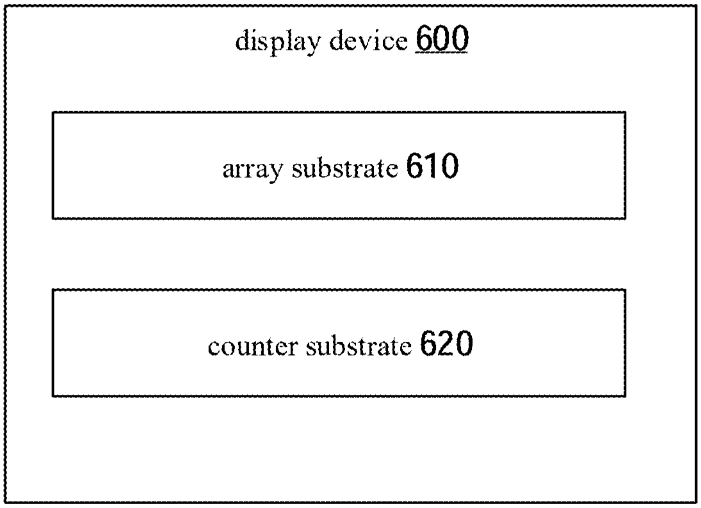
FIG. 6A shows a schematic diagram of a display device provided by at least one embodiment of the present disclosure.

FIG. 6A shows a schematic diagram of a display device 600 provided by at least one embodiment of the present disclosure.

As shown in FIG. 6A, the display device 600 includes an array substrate 610, which may be the array substrate provided by any of the above embodiments.

In addition to the array substrate 610, the display device 600 further includes a counter substrate 620. The counter substrate 620 is arranged opposite to the array substrate 610. For example, in the case where the display device is a liquid crystal display device, the display device further includes a liquid crystal layer, and the liquid crystal layer is arranged between the counter substrate and the array substrate. The counter substrate includes a color filter layer, the color filter layer includes a plurality of color filters; the plurality of color filters include a plurality of blue color filters, a plurality of red color filters and a plurality of green color filters; and the plurality of color filters are arranged corresponding to the plurality of rows and the plurality of columns of sub-pixels.

Figure 6B:
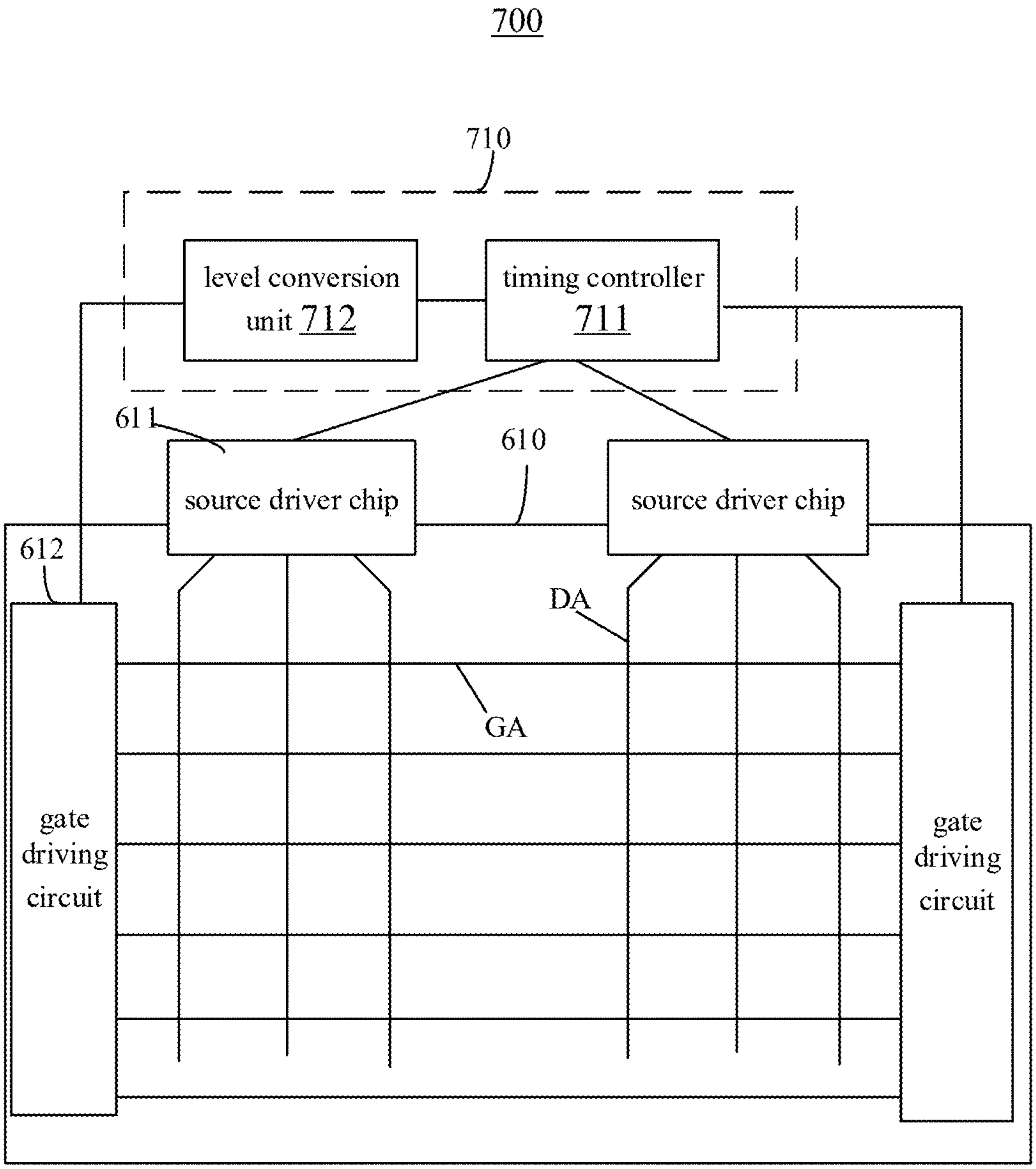
FIG. 6B shows a schematic diagram of another display device provided by at least one embodiment of the present disclosure.

FIG. 6B shows a schematic diagram of another display device 700 provided by at least one embodiment of the present disclosure.

In addition to the array substrate 610, the display device 700 can further include a circuit board 710, which is electrically connected with the array substrate (it should be noted that the electrical connection in the present disclosure may be direct or indirect, that is, there may be other components or elements arranged therebetween, without being limited here). The circuit board 710 includes a timing controller 711; optionally, the circuit board may be a printed circuit board (PCB). The array substrate 610 further includes a source driver chip 611, which can be optionally bonded onto the non-display region of the array substrate (COG technique) to provide data signals for data lines in the display region; alternatively, the source driver chip is arranged on a flexible printed circuit board, and the flexible printed circuit board is bonded to a bonding region of the non-display region of the array substrate to realize electrical connection (COF technique). The timing controller 711 is coupled with the source driver chip 611 and configured to provide display data to the source driver chip 611. The source driver chip 611 is coupled with a plurality of data lines DA (e.g., data lines D1-D6 in FIG. 2A) and configured to provide data signals to the plurality of data lines DA according to the display data.

A plurality of source driver chips 611 may be provided, and different source driver chips are coupled with different data lines. For example, as shown in FIG. 1, two source driver chips 611 may be provided, one of the two source driver chip 611 is coupled with one half of the data lines, and the other of two source driver chip 611 is coupled with the other half of the data lines. Of course, three, four, or more source driver chips 611 may also be provided, which can be designed and determined according to the requirements of practical applications, and are not limited here.

The timing controller 711 sends display data to the source driver chip 611, so that the source driver chip 611 loads data signals (i.e., data voltages) to the data lines in the array substrate according to the received display data, thereby charging the sub-pixels. Thus, each sub-pixel is charged with a corresponding target data voltage, and the screen display function is achieved.

In addition to the timing controller 711, the circuit board 710 may further include a level conversion unit 712, and the array substrate 610 can further include a gate driving circuit 612.

The level conversion unit 712 is coupled with the timing controller 711, and the gate driving circuit 612 is connected with the level conversion unit 712 and a plurality of gate lines GA (e.g., the gate lines G1-G8 in FIG. 2A). The level conversion unit 712 is configured to receive a plurality of first clock signals provided by the timing controller 711, convert the plurality of first clock signals into a plurality of second clock signals, and provide the plurality of second clock signals to the gate driving circuit 612; and the gate driving circuit 612 is configured to provide a plurality of gate signals to the gate lines GA according to the plurality of second clock signals, so as to control the gate lines to be turned on. Referring to FIG. 6B, illustrated is a scheme in which gate driving circuits are arranged on both sides of the non-display region around the display panel. The gate driving circuits on both sides may drive the same gate lines in the display region; or the gate driving circuit on one side may drive odd rows of gate lines and the gate driving circuit on the other side may drive even rows of gate lines. Alternatively, in the present disclosure, the gate driving circuit may be provided only in the non-display region on one side of the display panel, which is not limited here.

Optionally, the display device further includes a system on chip SOC, and the SOC is electrically connected with the timing controller. Exemplarily, in the present disclosure, the HSR function is enabled to improve the charging rate of the display rows, so that data signals of at least part of the display rows are charged for 2H. Here, in order to realize the charging of the data signals of at least part of the rows for 2H, it can be realized by, but not limited to, the following methods: for example, the SOC deletes part of the data; or, the timing controller deletes part of the data; or, the source driver chip deletes part of the data. The deleted data may be, for example, half of the data of each frame being deleted. The deleted data may be interlaced deletion. For example, for each frame, only odd rows of data is retained, and even rows of data is deleted; or, for each frame, only even rows of data is retained, and odd rows of data is deleted; or, in two adjacent frames, the previous frame retains odd rows of data and deletes even rows of data, and the latter frame retains even rows of data and deletes odd rows of data. For example, for the first frame, only odd rows (e.g., 1st, 3rd, 5th, 7th, 9th or the like rows) of data is retained, and for the second frame, only even rows (e.g., 2nd, 4th, 6th, 8th, 10th or the like rows) of data is retained. Or, in two adjacent frames, the previous frame retains even rows of data and deletes odd rows of data, and the latter frame retains odd rows of data and deletes even rows of data. For example, for the first frame, only even rows (e.g., 2nd, 4th, 6th, 8th, 10th or the like rows) of data is retained, and for the second frame, only odd rows (e.g., 1st, 3rd, 5th, 7th, 9th or the like rows) of data is retained. The "row" here means that the pixels connected with each gate line correspond to one row, and the pixels connected with different gate lines correspond to different rows. There is no limitation here.

The level conversion unit 712 may be implemented as a level conversion circuit or a chip for level conversion. For example, the level conversion unit 712 can change the period or amplitude or the like of each of the plurality of first clock signals to obtain the plurality of second clock signals. For example, the level conversion unit 712 increases the voltage amplitude and period of the plurality of first clock signals. The level conversion unit 712 can convert p first clock signals provided by the timing controller 711 into q second clock signals, p is an integer greater than or equal to 1, q is an integer greater than or equal to 2, and q is greater than or equal to p. For example, if the array substrate includes 8 gate lines as a cyclic group, then q can be equal to 8.

The following should be noted:

(1) Only the structures involved in the embodiments of the present disclosure are illustrated in the drawings of the embodiments of the present disclosure, and other structures can refer to usual designs;

(2) The embodiments and features in the embodiments of the present disclosure may be combined in case of no conflict to acquire new embodiments.

What have been described above merely are exemplary embodiments of the present disclosure, and not intended to define the scope of the present disclosure, and the scope of the present disclosure is determined by the appended claims.

The invention claimed is:

1. An array substrate, comprising a pixel array formed by a plurality of rows and a plurality of columns of sub-pixels, wherein a plurality of gate lines and a plurality of data lines intersect to define the plurality of rows and the plurality of columns of sub-pixels, each row of sub-pixels among the plurality of rows of sub-pixels is connected with two adjacent gate lines among the plurality of gate lines;

at least one data line among the plurality of data lines is connected with two adjacent columns of sub-pixels among the plurality of columns of sub-pixels;

the plurality of gate lines are configured to turn on the plurality of rows of sub-pixels, and the plurality of data lines are configured to charge the plurality of columns of sub-pixels that are turned on;

the plurality of rows of sub-pixels comprise a plurality of groups of sub-pixels, each group of sub-pixels comprises part of the plurality of rows of sub-pixels, each row of sub-pixels among the part of the plurality of rows of sub-pixels comprises sub-pixels connected with a same gate line, and charging times of the part of the plurality of rows of sub-pixels are overlapped;

the part of the plurality of rows of sub-pixels comprises a first part of the plurality of rows of sub-pixels and a second part of the plurality of rows of sub-pixels, a charging time of the second part of the plurality of rows of sub-pixels is longer than a charging time of the first part of the plurality of rows of sub-pixels, during a first time period in which the charging times overlap, a same data signal is written into the first part of the plurality of rows of sub-pixels and the second part of the plurality of rows of sub-pixels, during a second time period in which the charging times do not overlap, a data signal written into the second part of the plurality of rows of sub-pixels is at least partially the same as the data signal written during the first time period, wherein a same data line is connected with the plurality of groups of sub-pixels, and a plurality of sub-pixels corresponding to a same color and connected with the same data line are connected with odd rows of gate lines or even rows of gate lines, two gate lines are taken as a gate line group, two rows of sub-pixels respectively connected with the two gate lines in the gate line group form a sub-pixel group, and sub-pixels connected with the same data line in the sub-pixel group correspond to a same color; and a plurality of groups of gate lines are sequentially turned on, wherein for each group of gate lines, a gate line connected with the first part of the plurality of rows of sub-pixels is turned on earlier than a gate line connected with the second part of the plurality of rows of sub-pixels.

2. The array substrate according to claim 1, wherein in the part of the plurality of rows of sub-pixels, a same data line is connected with a plurality of sub-pixels corresponding to a same color.

3. The array substrate according to claim 1, wherein the charging time of the first part of the plurality of rows of sub-pixels is a charging time of one row of sub-pixels, the charging time of the second part of the plurality of rows of sub-pixels is a charging time of two rows of sub-pixels, and the first part of the plurality of rows of sub-pixels and the second part of the plurality of rows of sub-pixels start being charged simultaneously.

4. The array substrate according to claim 1, wherein sub-pixels in a same column correspond to a same color, a plurality of sub-pixels corresponding to red are connected with the odd rows of gate lines, a plurality of sub-pixels corresponding to green are connected with the even rows of gate lines, and a plurality of sub-pixels corresponding to blue and connected with the same data line are connected with a plurality of odd rows of gate lines or a plurality of even rows of gate lines; or a plurality of sub-pixels corresponding to green are connected with the odd rows of gate lines, a plurality of sub-pixels corresponding to blue are connected with the even rows of gate lines, and a plurality of sub-pixels corresponding to red and connected with the same data line are connected with a plurality of odd rows of gate lines or a plurality of even rows of gate lines; or a plurality of sub-pixels corresponding to red are connected with the odd rows of gate lines, a plurality of sub-pixels corresponding to blue are connected with the even rows of gate lines, and a plurality of sub-pixels corresponding to green and connected with the same data line are connected with a plurality of odd rows of gate lines or a plurality of even rows of gate lines.

5. The array substrate according to claim 1, wherein sub-pixels in a same column correspond to a same color, a plurality of sub-pixels corresponding to red and connected with the same data line are connected with a plurality of odd rows of gate lines or a plurality of even rows of gate lines, a plurality of sub-pixels corresponding to green and connected with the same data line are connected with a plurality of odd rows of gate lines or a plurality of even rows of gate lines, and a plurality of sub-pixels corresponding to blue and connected with the same data line are connected with a plurality of odd rows of gate lines or a plurality of even rows of gate lines.

6. The array substrate according to claim 1, wherein an image frame comprises a first display period and a second display period, two adjacent odd rows of gate lines are taken as a group, two adjacent even rows of gate lines are taken as a group, and two rows of sub-pixels connected with each group of gate lines are taken as a group of sub-pixels, for odd rows of gate lines, a plurality of groups of odd rows of gate lines are sequentially turned on during the first display period; and for even rows of gate lines, a plurality of groups of eve rows of gate lines are sequentially turned on during the second display period, wherein, in each group of gate lines, a gate line connected with the first part of the plurality of rows of sub-pixels is turned on earlier than a gate line connected with the second part of the plurality of rows of sub-pixels.

7. The array substrate according to claim 1, wherein the plurality of gate lines comprise a plurality of first gate line groups, the plurality of groups of sub-pixels comprise a plurality of first sub-pixel groups, each first gate line group comprises two adjacent gate lines, two rows of sub-pixels connected with each first gate line group form the first sub-pixel group, and two sub-pixels connected with a same data line in each first sub-pixel group correspond to a same color.

8. The array substrate according to claim 7, wherein the plurality of groups of sub-pixels further comprise a second sub-pixel group, the second sub-pixel group comprises a plurality of sub-pixels connected with a gate line firstly turned on among the plurality of gate lines, and the plurality of the first sub-pixel groups comprise a plurality of rows of sub-pixels other than the plurality of sub-pixels comprised in the second sub-pixel group.

9. The array substrate according to claim 7, wherein the plurality of gate lines are sequentially turned on, and in each group of sub-pixels, a gate line connected with the first part of the plurality of rows of sub-pixels is turned on earlier than a gate line connected with the second part of the plurality of rows of sub-pixels.

10. A driving method, applied to the array substrate according to claim 1, wherein the method comprises:

turning on a plurality of gate lines connected with each group of sub-pixels; and charging, during a period when the plurality of gate lines of each group of sub-pixels are turned on, each group of sub-pixels by the plurality of data lines.

11. The method according to claim 10, wherein an image frame comprises a first display period and a second display period, two adjacent odd rows of gate lines are taken as a group, two adjacent even rows of gate lines are taken as a group, and two rows of sub-pixels connected with each group of gate lines are taken as a group of sub-pixels;

wherein the turning on the plurality of gate lines connected with each group of sub-pixels comprises:

during the first display period, turning on the odd rows of gate lines sequentially;

during the second display period, turning on the even rows of gate lines sequentially, wherein, in each group of gate lines, a gate line connected with the first part of the plurality of rows of sub-pixels is turned on earlier than a gate line connected with the second part of the plurality of rows of sub-pixels.

12. The method according to claim 10, wherein the turning on the plurality of gate lines connected with each group of sub-pixels comprises:

turning on a plurality of groups of gate lines sequentially, wherein, for each group of gate lines, a gate line connected with the first part of the plurality of rows of sub-pixels is turned on earlier than a gate line connected with the second part of the plurality of rows of sub-pixels.

13. The method according to claim 10, wherein the plurality of gate lines comprise a plurality of first gate line groups, each group of sub-pixels comprises two adjacent rows of sub-pixels, each first gate line group comprises two adjacent gate lines, the plurality of groups of sub-pixels comprise a plurality of first sub-pixel groups, and two sub-pixels connected with a same data line in each first sub-pixel group correspond to a same color, wherein the turning on the plurality of gate lines connected with each group of sub-pixels comprises:

turning on each gate line sequentially, wherein a gate line connected with the first part of the plurality of rows of sub-pixels is turned on earlier than a gate line connected with the second part of the plurality of rows of sub-pixels.

14. The method according to claim 10, wherein the charging time of the first part of the plurality of rows of sub-pixels is a charging time of one row of sub-pixels, the charging time of the second part of the plurality of rows of sub-pixels is a charging time of two rows of sub-pixels, and the first part of the plurality of rows of sub-pixels and the second part of the plurality of rows of sub-pixels start being charged simultaneously.

15. A display device, comprising the array substrate according to claim 1.

16. The display device according to claim 15, further comprising a counter substrate, wherein the counter substrate comprises a color filter layer, the color filter layer comprises a plurality of color filters, the plurality of color filters comprise a plurality of blue color filters, a plurality of red color filters and a plurality of green color filters, and the plurality of color filters are in one-to-one correspondence with the plurality of rows and the plurality of columns of sub-pixels.

17. The display device according to claim 15, further comprising a circuit board, wherein the circuit board is provided with a timing controller, and the array substrate further comprises a source driver chip, wherein the timing controller is coupled with the source driver chip and configured to provide display data to the source driver chip; and the source driver chip is coupled with the plurality of data lines and configured to provide data signals to the plurality of data lines according to the display data.

18. The display device according to claim 17, wherein the circuit board further comprises a level conversion unit, and the array substrate further comprises a gate driving circuit, the level conversion unit is coupled with the timing controller, the gate driving circuit is connected with the level conversion unit and the plurality of gate lines, the level conversion unit is configured to receive a plurality of first clock signals provided by the timing controller, convert the plurality of first clock signals into a plurality of second clock signals, and provide the plurality of second clock signals to the gate driving circuit, and the gate driving circuit is configured to provide gate signals to the plurality of gate lines according to the plurality of second clock signals, so as to control the plurality of gate lines to be turned on.

* * * * *